(12) United States Patent
Alasirniö et al.

(10) Patent No.: US 10,771,714 B2
(45) Date of Patent: Sep. 8, 2020

(54) IMAGE SENSOR MODULES INCLUDING PRIMARY HIGH-RESOLUTION IMAGERS AND SECONDARY IMAGERS

(71) Applicant: AMS SENSORS SINGAPORE PTE. LTD., Singapore (SG)

(72) Inventors: Jukka Alasirniö, Jääli (FI); Tobias Senn, Zurich (CH); Ohad Meitav, Sunnyvale, CA (US); Moshe Doron, San Francisco, CA (US); Alireza Yasan, San Jose, CA (US); Mario Cesana, Au (CH); Florin Cutu, San Jose, CA (US); Hartmut Rudmann, Jona (CH); Markus Rossi, Jona (CH); Peter Roentgen, Thalwil (CH); Daniel Perez Calero, Zurich (CH); Bassam Hallal, Thalwil (CH); Jens Geiger, Thalwil (CH)

(73) Assignee: ams Sensors Singapore Pte. Ltd., Singapore (SG)

(*) Notice: Subject to any disclaimer, the term of this patent is extended or adjusted under 35 U.S.C. 154(b) by 25 days.

(21) Appl. No.: 15/121,459

(22) PCT Filed: Feb. 23, 2015

(86) PCT No.: PCT/SG2015/000051
§ 371 (c)(1),
(2) Date: Aug. 25, 2016

(87) PCT Pub. No.: WO2015/130226
PCT Pub. Date: Sep. 3, 2015

(65) Prior Publication Data
US 2018/0124327 A1    May 3, 2018

Related U.S. Application Data

(60) Provisional application No. 61/944,293, filed on Feb. 25, 2014, provisional application No. 61/971,665, (Continued)

(51) Int. Cl.
*H04N 5/247* (2006.01)
*G03B 37/04* (2006.01)
(Continued)

(52) U.S. Cl.
CPC ......... *H04N 5/247* (2013.01); *G02B 13/0085* (2013.01); *G03B 15/05* (2013.01);
(Continued)

(58) Field of Classification Search
CPC .... H04N 5/247; H04N 5/2253; H04N 5/2256; H04N 5/332; G02B 13/0085; G02B 15/05; G02B 17/12; G02B 35/08; G02B 37/04
See application file for complete search history.

(56) References Cited

U.S. PATENT DOCUMENTS 8,478,123 B2 * 7/2013 Cao ..................... G03B 9/02
250/332
8,514,491 B2    8/2013 Duparre
(Continued)

OTHER PUBLICATIONS

Australian Patent Office, International Search Report for International Patent Application No. PCT/SG2015/000051, dated Jul. 1, 2015.
(Continued)

*Primary Examiner* — Maria E Vazquez Colon
(74) *Attorney, Agent, or Firm* — Michael Best and Friedrich LLP

(57) ABSTRACT

Image sensor modules include primary high-resolution imagers and secondary imagers. For example, an image
(Continued)

sensor module may include a semiconductor chip including photosensitive regions defining, respectively, a primary camera and a secondary camera. The image sensor module may include an optical assembly that does not substantially obstruct the field-of-view of the secondary camera. Some modules include multiple secondary cameras that have a field-of-view at least as large as the field-of-view of the primary camera. Various features are described to facilitate acquisition of signals that can be used to calculate depth information.

15 Claims, 31 Drawing Sheets

Related U.S. Application Data filed on Mar. 28, 2014, provisional application No. 62/000,346, filed on May 19, 2014, provisional application No. 62/024,025, filed on Jul. 14, 2014, provisional application No. 62/051,115, filed on Sep. 16, 2014.

(51) Int. Cl.

| | |
|---|---|
| *G03B 35/08* | (2006.01) |
| *G03B 15/05* | (2006.01) |
| *G03B 17/12* | (2006.01) |
| *G02B 13/00* | (2006.01) |
| *H04N 5/225* | (2006.01) |
| *H04N 5/33* | (2006.01) |

(52) U.S. Cl.
CPC ............ *G03B 17/12* (2013.01); *G03B 35/08* (2013.01); *G03B 37/04* (2013.01); *H04N 5/2253* (2013.01); *H04N 5/2256* (2013.01); *H04N 5/332* (2013.01)

(56) References Cited

U.S. PATENT DOCUMENTS

| | | | | |
|---|---|---|---|---|
| 2001/0009611 | A1* | 7/2001 | Akami | G03B 17/04 |
| | | | | 396/29 |
| 2006/0139475 | A1 | 6/2006 | Esch et al. | |
| 2008/0121784 | A1* | 5/2008 | Chang | H04N 5/2253 |
| | | | | 250/208.1 |
| 2010/0166410 | A1 | 7/2010 | Chang | |
| 2010/0261961 | A1* | 10/2010 | Scott | A61B 1/00193 |
| | | | | 600/111 |
| 2011/0122308 | A1 | 5/2011 | Duparre | |
| 2011/0176020 | A1* | 7/2011 | Chang | G03B 17/12 |
| | | | | 348/222.1 |
| 2011/0221599 | A1* | 9/2011 | Hogasten | H01L 27/14609 |
| | | | | 340/632 |
| 2012/0188391 | A1 | 7/2012 | Smith | |
| 2013/0329126 | A1* | 12/2013 | Brodie | G02B 7/023 |
| | | | | 348/360 |
| 2016/0241841 | A1* | 8/2016 | Dorot | G03B 35/10 |

OTHER PUBLICATIONS

Australian Patent Office, Written Opinion for International Patent Application No. PCT/SG2015/000051, dated Jul. 1, 2015.

* cited by examiner

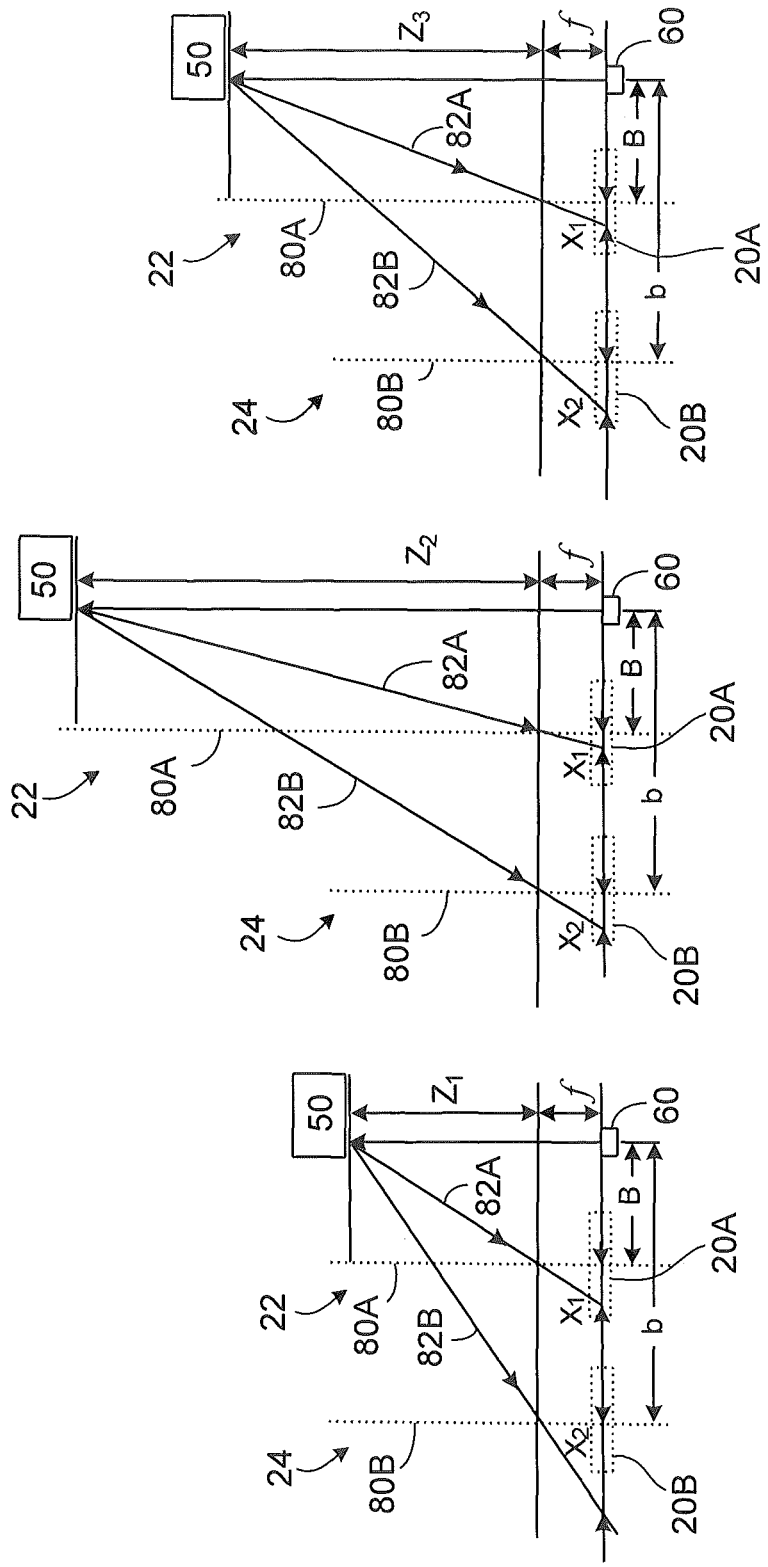

IMAGE SENSOR MODULES INCLUDING PRIMARY HIGH-RESOLUTION IMAGERS AND SECONDARY IMAGERS

TECHNICAL FIELD

This disclosure relates to image sensor modules and, in particular, to image sensor modules that include primary high-resolution imagers and secondary imagers.

BACKGROUND

Image sensors are used in cameras and other imaging devices to capture images. For example, light entering through an aperture at one end of the imaging device is directed to an image sensor by a beam shaping system (e.g., one or more passive optical elements such as lenses). The image sensors include pixels that generate signals in response to sensing received light. Commonly used image sensors include CCD (charge-coupled device) image sensors and CMOS (complementary metal-oxide-semiconductor) sensors.

The combination of a primary camera and secondary cameras can be used, for example, for high-resolution image capture as well as other applications, such as gesture recognition.

SUMMARY

This disclosure describes various image sensor modules that include primary high-resolution imagers and secondary imagers. In some implementations, a secondary imager can be used, for example, in conjunction with the primary imager or in conjunction with another secondary imager to obtain depth information.

For example, in one aspect, an image sensor module includes a semiconductor chip including photosensitive regions defining, respectively, a primary camera and a secondary camera. The image sensor module includes an optical assembly that does not substantially obstruct the field-of-view (FOV) of the secondary camera.

Some implementations include one or more of the following features. For example, the optical assembly can include a lens barrel that does not substantially obstruct the field-of-view of the secondary camera. In some cases, the lens barrel has a substantially flat, planar section on its side surface, and the secondary camera is disposed adjacent the substantially flat, planar section. In some instances, an object-side of the lens barrel has a truncated cone-shape.

In accordance with another aspect, an image sensor module includes a semiconductor chip that has photosensitive regions corresponding, respectively, to a primary camera and a plurality of secondary cameras. Each of the secondary cameras has a field-of-view that is substantially similar to the field-of-view of the primary camera or that is larger than the field-of-view of the primary camera.

In another aspect, a device includes an image sensor module that includes a semiconductor chip including photosensitive regions defining, respectively, a primary camera and at least one secondary camera. The device also includes a light source to project light within a predetermined wavelength range. The module includes respectively, for each secondary camera, an optical assembly that includes a band-pass filter that allows visible light, and light corresponding to the light emitted by the light source, to pass to the secondary camera.

In yet another aspect, a device includes an image sensor module that includes a semiconductor chip having photosensitive regions corresponding, respectively, to a primary camera and at least one secondary camera. Processing circuitry is coupled to receive signals from the primary camera and the secondary camera(s). The processing circuitry is adapted to acquire high-resolution image data based on the signals from the primary camera and to acquire depth data based on the signals from the secondary camera(s).

Various methods are described for using the image sensor modules to obtain high-resolution 2-D images as well 3-D images that include depth information.

Various advantages can be obtained in some implementations. For example, providing the primary and secondary cameras on the same semiconductor chip (i.e., on the same sensor) can result in various benefits such as easier installation into a host device (e.g., a smart phone) and reduced likelihood for camera misalignment. Further, in some cases, depth data obtained by the secondary imagers may be mapped (or warped) onto a high-resolution image captured by the primary imager. For such implementations, the baseline distance between the primary imager's optical channel and the secondary imager's optical channel should be as small as possible to facilitate mapping/warping the depth data onto the primary image. The small baseline can be achieved. For example, by placing the primary and secondary imagers on the same sensor. Further, for a device that employs a shutter to capture an image, the device need not synchronize separate shutters as the shutter can be common to both the primary and secondary cameras. In contrast, if multiple sensors are used, the shutters for the individual sensors need to be triggered simultaneously. From a manufacturing point of view, it can be easier, and thus less costly, to make one contiguous assembly rather than producing multiple independent cameras. Employing one sensor can reduce the space required for the camera and thus can reduce cost.

Some implementations also provide ambient light sensing.

Other aspects, features and advantages will be apparent form the following detailed description, the accompanying drawings and the claims.

BRIEF DESCRIPTION OF THE DRAWINGS

FIGS. 14A-14D illustrate examples of image sensor modules providing more than one imager-projector baseline.

DETAILED DESCRIPTION

Figure 1A:
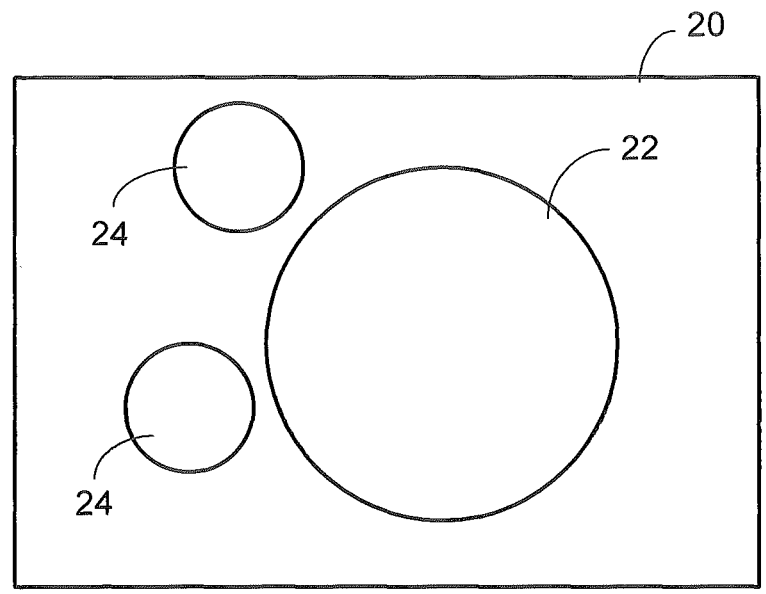
FIG. 1A is a top view of an image sensor layout.
Figure 1B:
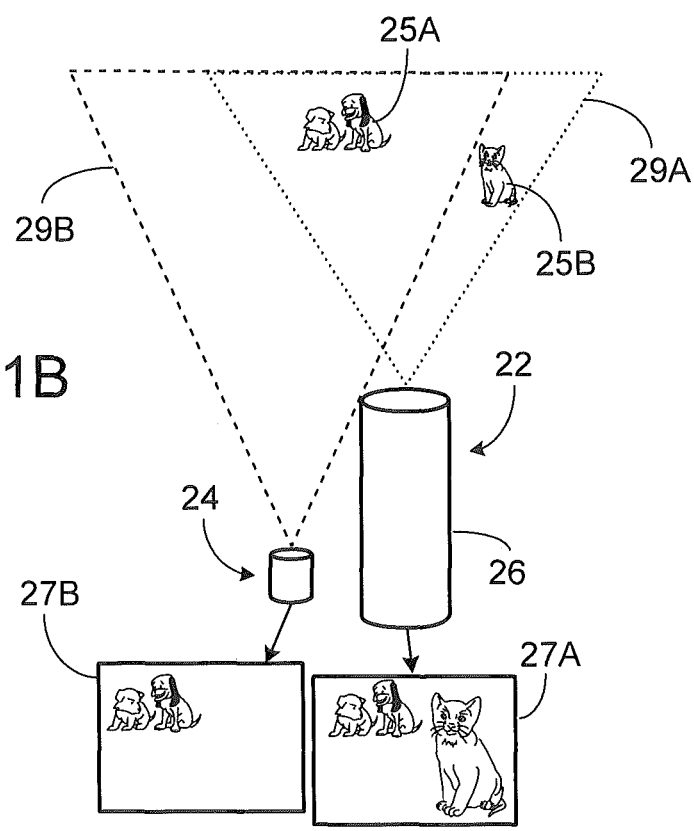
FIG. 1B illustrates a side view of an image sensor module in which the FOV of a secondary camera is partially obstructed by the lens barrel of a primary camera.

As illustrated in FIG. 1A, an image sensor 20 includes both a primary high-resolution camera 22 (e.g., 1920 pixels× 1080 pixels) and two or more secondary cameras 24 that form a contiguous assembly. FIG. 1B shows the primary camera 22 and one of the secondary camera 24. The sensor 20 includes photosensitive regions that correspond, respectively, to each camera, and can be implemented, for example, on a single integrated semiconductor chip, for example, as a CCD or CMOS sensor. The primary camera 22 collects signals representing a primary two-dimensional (2-D) image; the secondary cameras can be used to provide additional secondary 2-D images that, for example, may be used for stereo matching and thus can provide three-dimensional (3-D) images or other depth information.

3-D images or other depth information that encompass the entire object area imaged by the primary camera may be acquired, for example: 1) when the field-of-view (FOV) of each secondary camera substantially encompasses the FOV of the primary camera, 2) when the FOV of one secondary camera substantially encompasses the FOV of the primary camera, or 3) when the combined FOV of the secondary cameras substantially encompass the FOV of the primary camera. In addition, combinations of these techniques also are possible, depending on the limitations, requirements, and information desired in a particular application.

In accordance with the first approach, the FOV of each of a plurality of secondary cameras substantially encompasses the FOV of the primary camera. Simultaneously acquired images from the secondary cameras then can be processed via well-known stereo-matching algorithms to produce a 3-D image or other depth information. In addition, a higher resolution image is acquired by the primary camera.

According to the second approach, the FOV of a single secondary camera substantially encompasses the FOV of the primary camera. Simultaneously acquired images from the secondary camera and primary camera then can be processed via well-known stereo-matching algorithms to produce a 3-D image or other depth information. In this case, the higher resolution image acquired by the primary camera also is used for the acquisition of a 3-D image or other depth information.

In accordance with the third approach, the combined FOV of multiple secondary cameras substantially encompasses the FOV of the primary camera. Simultaneously acquired images from the secondary cameras and primary camera are then processed to produce a 3-D image or other depth information. The processing can proceed, as above, via well-known stereo-matching algorithms. However, regions in the primary image that correspond to the secondary images are used for matching. Thus, as in the second approach above, the higher resolution image acquired by the primary camera also is used for the acquisition of a 3-D image or other depth information.

Providing the primary and secondary cameras on the same semiconductor chip and as part of the same contiguous assembly can result in various benefits such as easier installation into a host device (e.g., a smart phone) and reduced likelihood for camera misalignment. Further, from a manufacturing point of view, it can be easier, and thus less costly, to make one contiguous assembly rather than producing multiple independent cameras. Employing one sensor can reduce the space required for the camera and thus can reduce cost. In addition to gesture recognition, depth information may be combined with the high resolution image captured by the primary camera.

Despite the foregoing benefits, combining the primary and secondary cameras on the same sensor chip sometimes raises additional challenges. For example, as shown in FIG. 1B, the lens barrel 26 that holds the beam shaping elements (e.g., lenses) for the primary camera 22 may obstruct the effective FOV 29B of the individual secondary cameras 24. Thus, in the illustrated example, the FOV 29A of the primary camera 22 encompasses a first item 25A and a second item 25B, whereas the effective FOV 29B of the secondary camera 24 encompasses only the first item 25A. The image 27A obtained from the primary camera 22 is a high-resolution two-dimensional (2-D) image that includes both items 25A and 25B; the image 27B obtained from the secondary camera 24 is a lower-resolution 2-D image that includes item 25A, but not item 25B. If stereo matching then is performed based on both of the images 27A, 27B, the result will be a three-dimensional (3-D) image containing information for item 27A only. However, the resulting image will not contain 3-D depth information for item 25B. Thus, the resulting image contains incomplete depth information. Various approaches to addressing this problem are described below.

In a first approach, the lens barrel for the primary camera is designed such that it does not substantially obstruct the FOV of the secondary cameras. In this context, the lens barrel of the primary camera can be considered not to substantially obstruct the FOV of the secondary cameras if the primary lens barrel does not limit the FOV of the secondary cameras to substantially less than the FOV of the primary camera. In situations in which only a single secondary camera is considered, the lens barrel of the primary camera can be considered not to substantially obstruct the FOV of the secondary camera if the primary lens barrel does not limit the FOV of the secondary camera to substantially less than the FOV of the primary camera.

Figure 2:
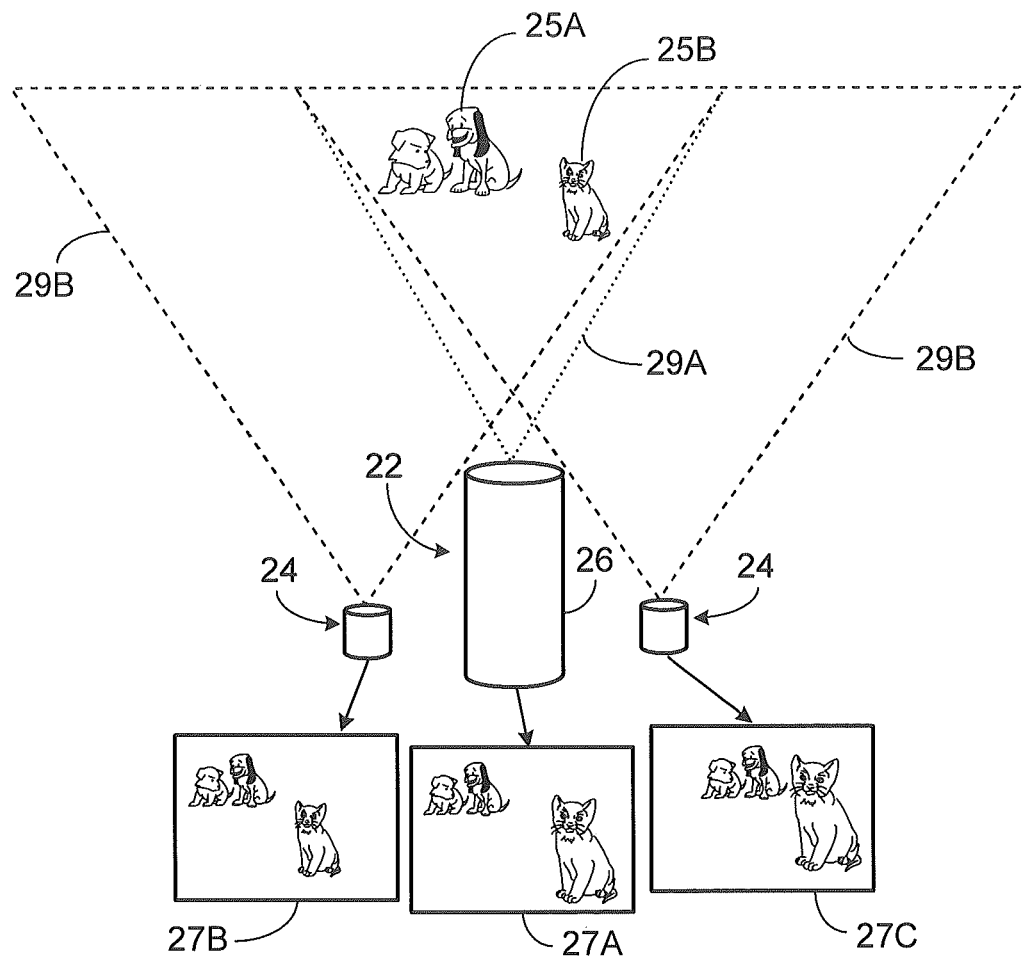
FIG. 2 illustrates an example of an image sensor module in which the collective FOV of secondary cameras encompasses at least the FOV of the primary camera.

Preferably, in instances that include multiple secondary cameras, the FOV of the secondary cameras 24 encompasses at least the same FOV as the primary camera 22. Further, in some cases, each secondary camera 24 individually can have an FOV that encompasses at least the same FOV as the primary camera 22. FIG. 2 illustrates such an example and includes two secondary cameras 24, each of which has a respective FOV 29B that encompasses at least the same FOV 29A as the primary camera 22. In the illustrated example, the FOV 29A of the primary camera 22 encompasses first and second items 25A, 25B. Likewise, the respective FOV 29B of each secondary camera 24 encompasses both items 25A, 25B. Thus, the image 27A obtained from the primary camera 22 is a high-resolution 2-D image that includes both items 25A and 25B. Likewise, each respective image 27B, 27C obtained from the secondary cameras 24 is a lower-resolution 2-D image that includes both items 25A, 25B. Simultaneously acquired images from the secondary cameras can be processed using well-known stereo-matching algorithms to produce a 3-D image or other depth information. In addition, a higher resolution image is acquired by the primary camera.

Figure 3A:
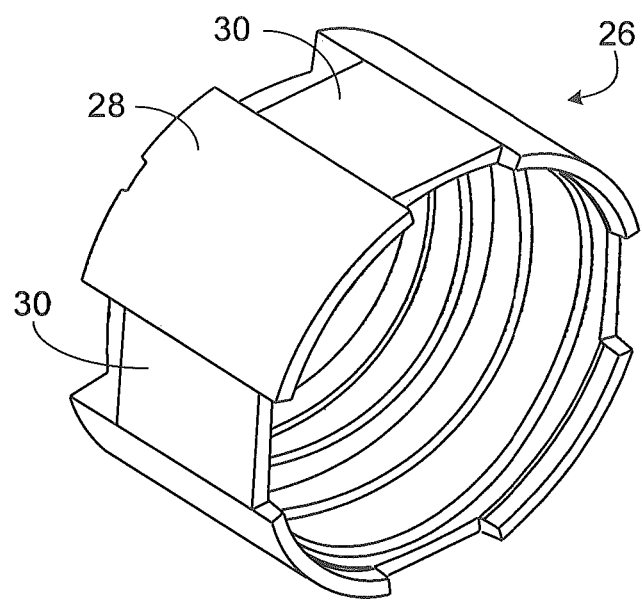
FIG. 3A illustrates an example of a lens barrel.
Figure 3B:
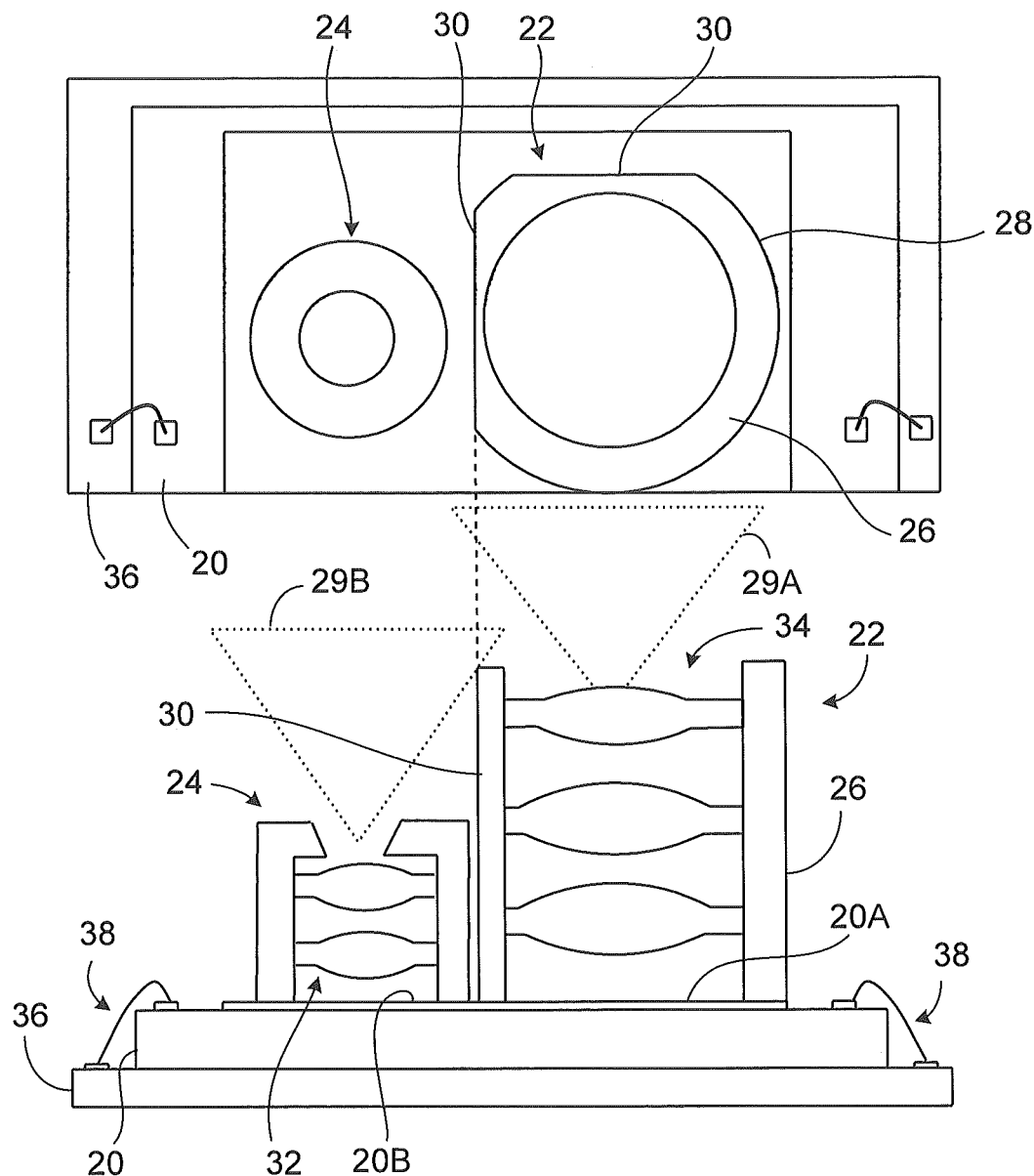
FIG. 3B illustrates a side view and top view of an image sensor module in which the FOV of a secondary camera is not obstructed by the lens barrel of a primary camera.

FIG. 3A illustrates a first implementation in which the lens barrel 26 for the primary camera 22 is designed such that it does not substantially obstruct the FOV of the secondary cameras. As illustrated, the outer side surface of the lens barrel 26 has one or more substantially flat, planar sections 30. Although the overall shape of the lens barrel 26 can be generally cylindrical, the flat, planar region 30 allows a secondary camera 24 to be placed relatively close to the primary camera 22, without the lens barrel 26 interfering with the FOV 29B of the secondary camera (see FIG. 3B). As shown in FIG. 3B, a primary camera 22 including a lens stack 34 is disposed over a photosensitive region 20A of a sensor 20, and a secondary camera 24 including a lens stack 32 is disposed over a different photosensitive region 20B of the sensor 20. Both cameras, 22, 24 are formed on the same sensor chip 20. The secondary camera 24 is adjacent a flat, planar region 30 of the lens barrel 26 of the primary camera 22 so that the lens barrel 26 does not substantially obstruct the FOV 29B of the secondary camera 24. In some cases, the lens barrel 26 does not obstruct the FOV 29B of the secondary camera 24 at all. A second secondary camera can be provided, for example, adjacent another flat, planar region 30 of the lens barrel 26 of the primary camera 22.

As further illustrated in FIG. 3B, the sensor 20 can be mounted on a printed circuit board (PCB) or other substrate 36. Electrical connections (e.g., wires or flip-chip type connections) 38 can be provided from the sensor 20 to the PCB 36. Processing circuitry, which also can be mounted, for example, on the PCB 36, can receive and process the high-resolution image and depth information from the cameras 22, 24.

Figure 3C:
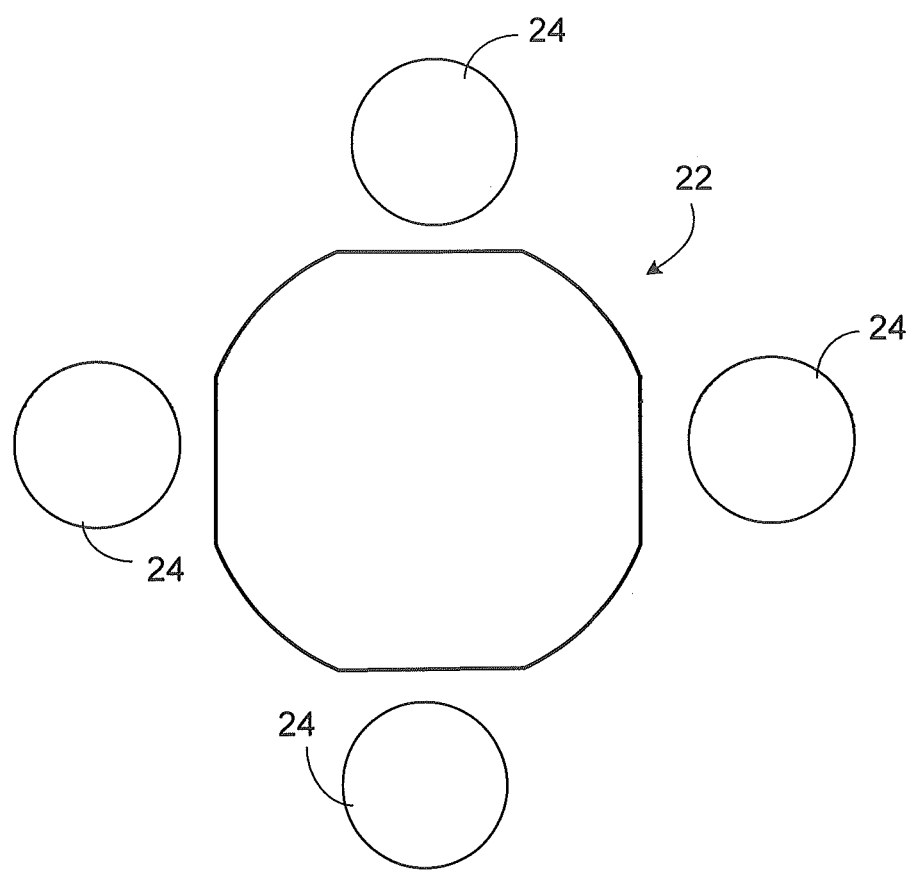
FIG. 3C is a top view of another image sensor layout.

Some implementations may include even more than two secondary cameras, which can help produce better resolution and/or more accurate depth information. Once again, each secondary camera can be provided on a photosensitive region of the sensor 20 adjacent a flat, planar region 30 of the lens barrel 26 of the primary camera 22. An example is illustrated in FIG. 3C, which shows four secondary cameras 24. In some implementations, different types of optical filters are provided for the different secondary cameras 24. For example, different ones of the secondary cameras 24 may have filters that allow only light in the visible part of the spectrum (e.g., RGB and/or other visible light) to pass to the cameras, whereas other ones of the secondary cameras 24 may allow only infra-red (IR) light or monochrome light to pass to the cameras. Other combinations of optical filters can be used as well. Further, in some cases, the optical assembly (i.e., the lens stack 32) for each secondary camera 24 can be optimized for a particular wavelength or range of wavelengths. Further, in some instances, different ones of the secondary cameras 24 can have different types of polarizing filters or different aperture sizes.

Figure 4:
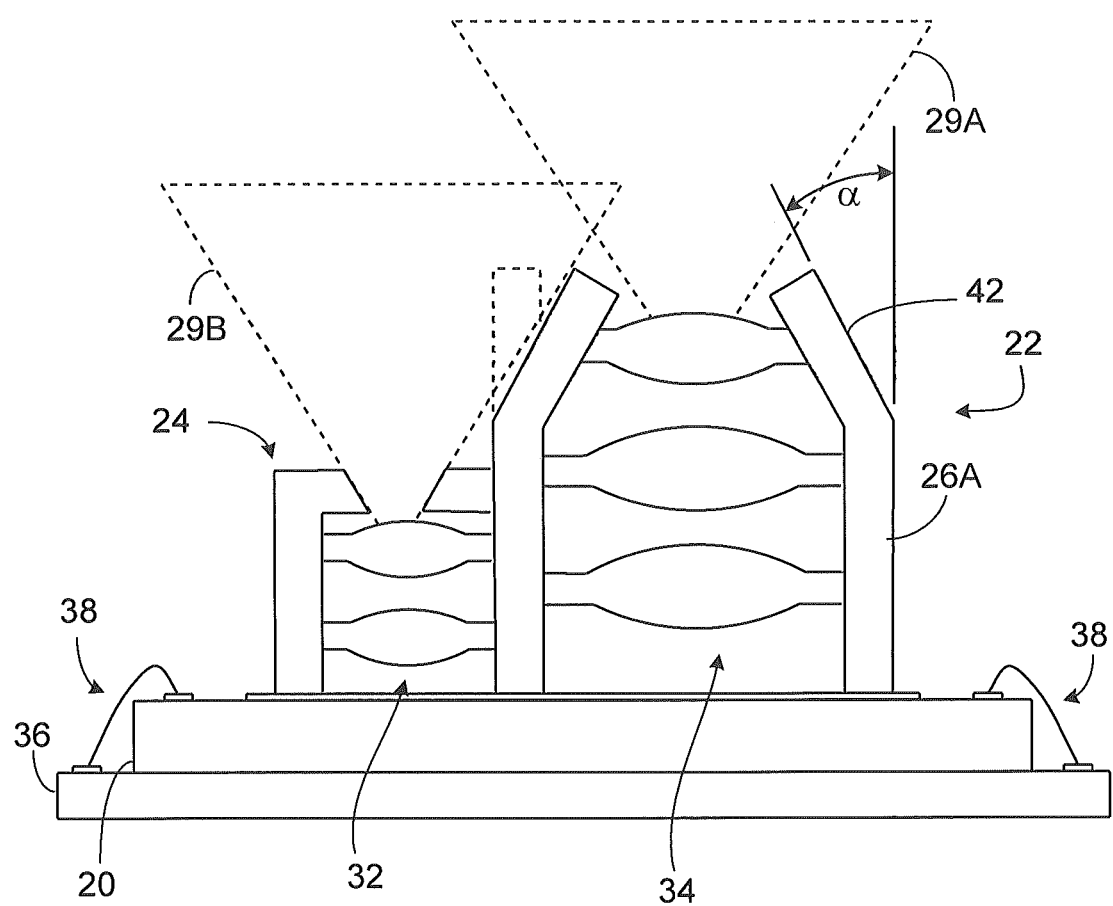
FIG. 4 is a side view of another image sensor module in which the FOV of a secondary camera is not obstructed by the lens barrel of a primary camera.

FIG. 4 illustrates an example of another implementation in which the lens barrel for the primary camera is designed such that it does not substantially obstruct the FOV of the secondary cameras (i.e., so that the combined FOV of the secondary cameras encompasses at least the same FOV as the primary camera). As shown in FIG. 4, a primary camera 22 has an associated lens barrel 26A having a truncated cone-shaped upper part. In particular, although the lower part (i.e., the sensor-side) of the lens barrel 26A can be substantially cylindrical-shaped, the upper part 42 (i.e., the object-side) has walls that slant inward at an angle (α) so as not to obstruct the FOV 29B of the secondary camera 24. As illustrated in FIG. 4, the outer diameter of the lens barrel 26A becomes increasingly smaller in the direction toward the object-side 42 of the lens barrel. This configuration preferably results in the lens barrel 26A not obstructing the FOV 29B of the secondary camera 24. As further shown in the example of FIG. 4, in some implementations, the primary and secondary lens barrels can be formed (e.g., by molding) as a single piece. Thus, the outer circumferential surface of one side of the secondary lens barrel can be formed as a common surface with an adjacent side of the primary lens barrel.

Figure 4A:
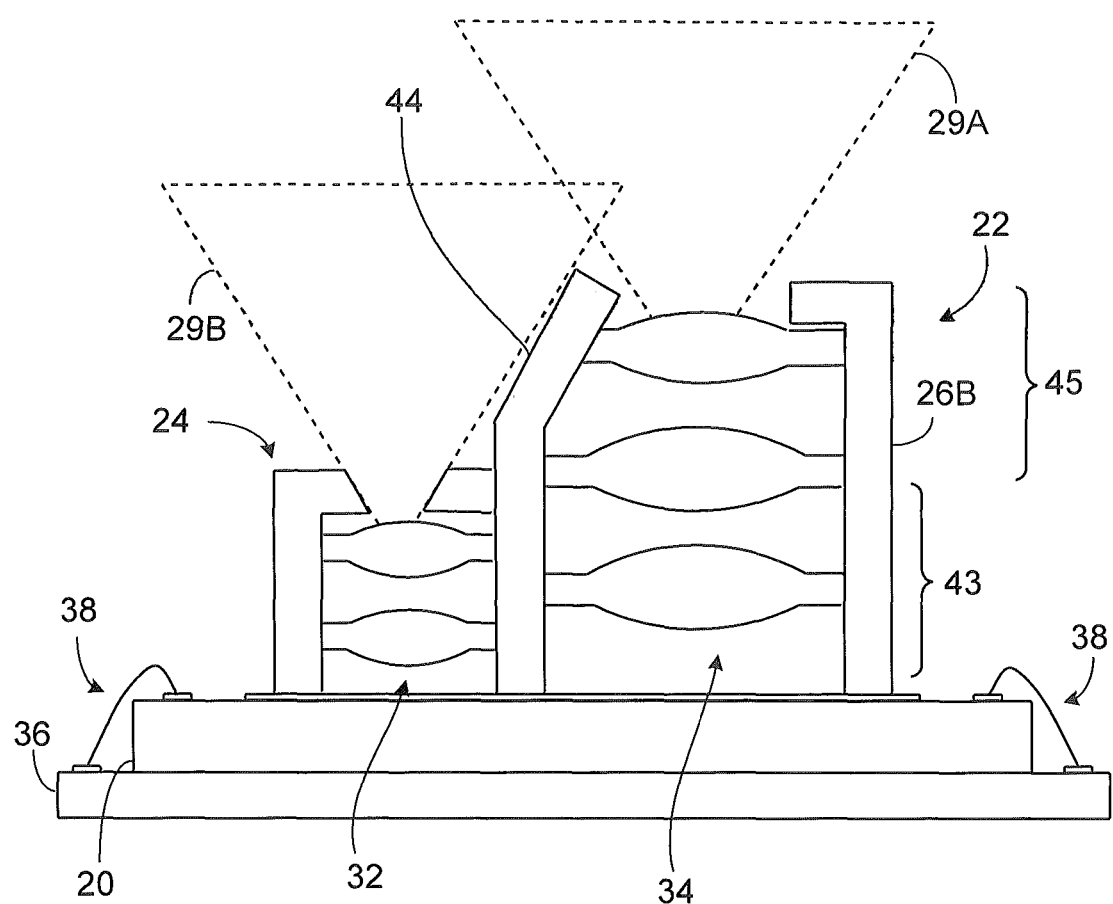
FIGS. 4A, 4B and 4C are side views of yet further image sensor modules in which the FOV of a secondary camera is not obstructed by the lens barrel of a primary camera.

Various modifications can be made to the implementations of FIGS. 3B and 4. Several examples are discussed in connection with FIGS. 4A, 4B, 4C. Other variations are possible as well. In some cases, instead of having a substantially cylindrical shape, the primary lens barrel can have a substantially rectangular parallelepiped shape. Such arrangements can allow lenses with at least one flat side, as well as square or rectangular lenses, to be assembled in the primary lens barrel. As illustrated in the example of FIG. 4A, the primary lens barrel 26B has a square cross-section at its lower portion 43 (i.e., the sensor-side), but has at least one inclined, substantially flat side 44 at its upper portion 45 (i.e., the object-side) such that the primary lens barrel 26B does not obstruct the FOV 29B of the secondary camera 24. The cross-section at the object-side portion 45 of the primary lens barrel 26B thus has a rectangular shape whose size decreases in a direction away from the sensor 20. In some implementations, more than one side of the primary lens barrel can be substantially flat and inclined. For example, the object-side portion 45 of the lens barrel 26B can be pyramid-shaped (i.e., all four sides are flat and inclined).

Figure 4B:
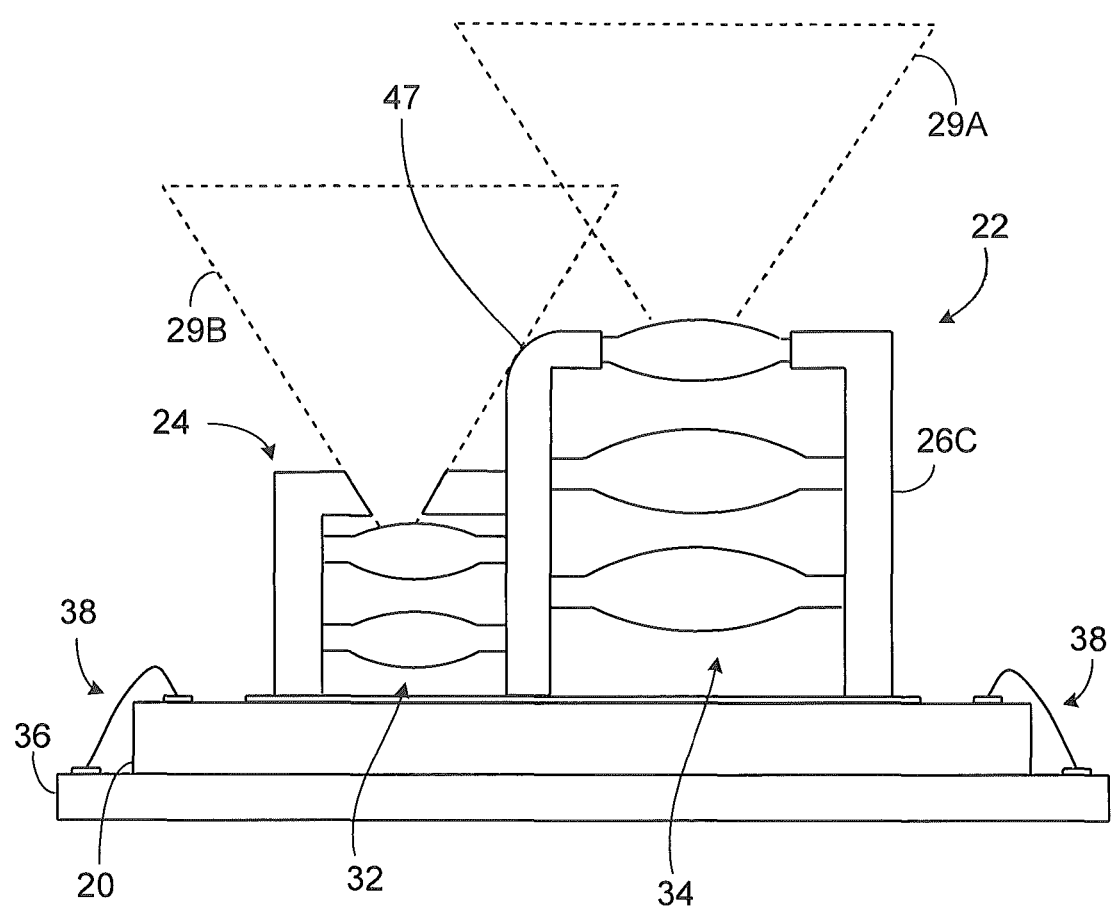

FIG. 4B illustrates yet another implementation in which the primary lens barrel 26C does not obstruct the FOV 29B of the secondary camera 24. In this example, the primary lens barrel 26C is, for example, substantially cylindrical. However, the side edge 47 that is at the end of the barrel opposite the sensor 20 and that is adjacent the secondary camera 24 is rounded. In some implementations, more than one side edge can be rounded. Further, in some cases, the primary lens barrel has a substantially rectangular parallelepiped shape, rather than a substantially cylindrical shape.

Figure 4C:
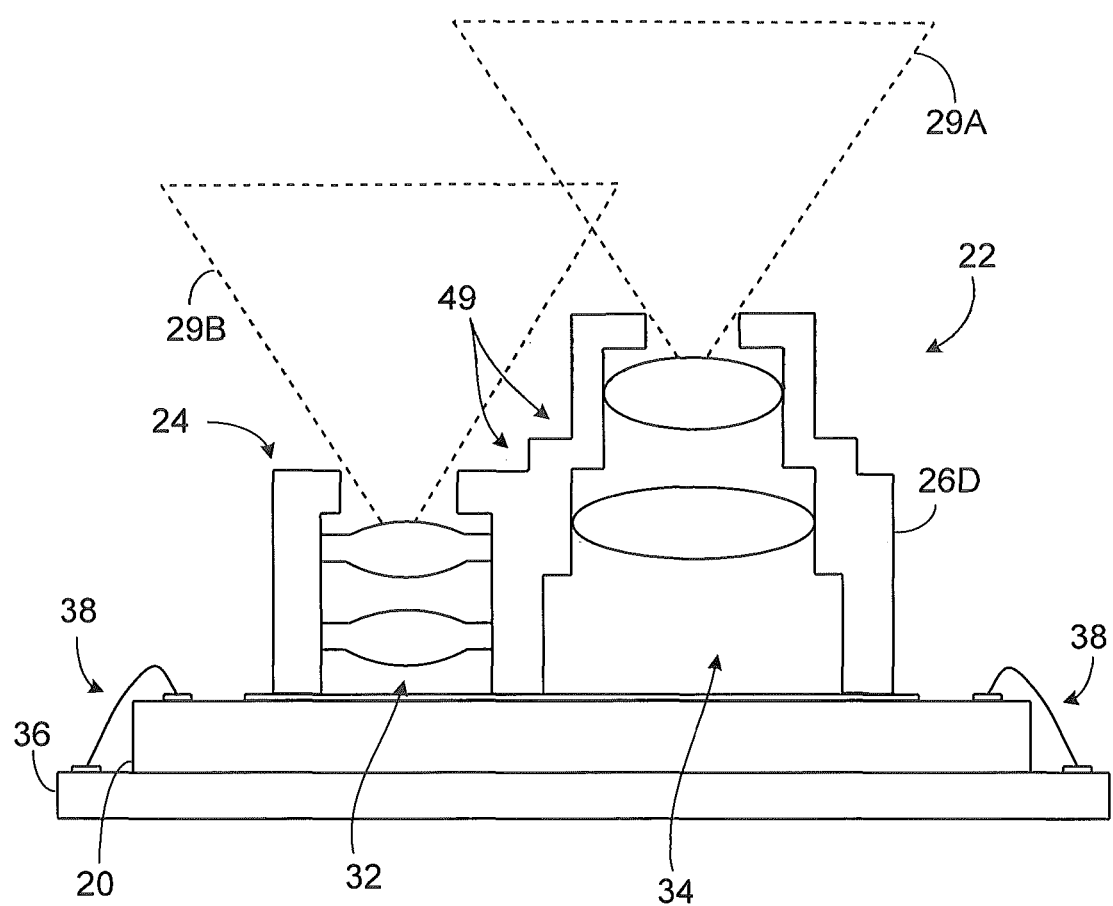

FIG. 4C illustrates a further implementation in which the primary lens barrel 26C does not obstruct the FOV 29B of the secondary camera 24. In this case, the primary lens barrel 26D, in which the lens barrel has different outer diameters, the sizes of which decrease relative to one another in a direction toward an object-side of the lens barrel. As illustrated in FIG. 4C, the outer surface of the primary lens barrel 26D can be stepped 49 such that the primary lens barrel 26D does not obstruct the FOV 29B of the secondary camera 24.

Figure 5:
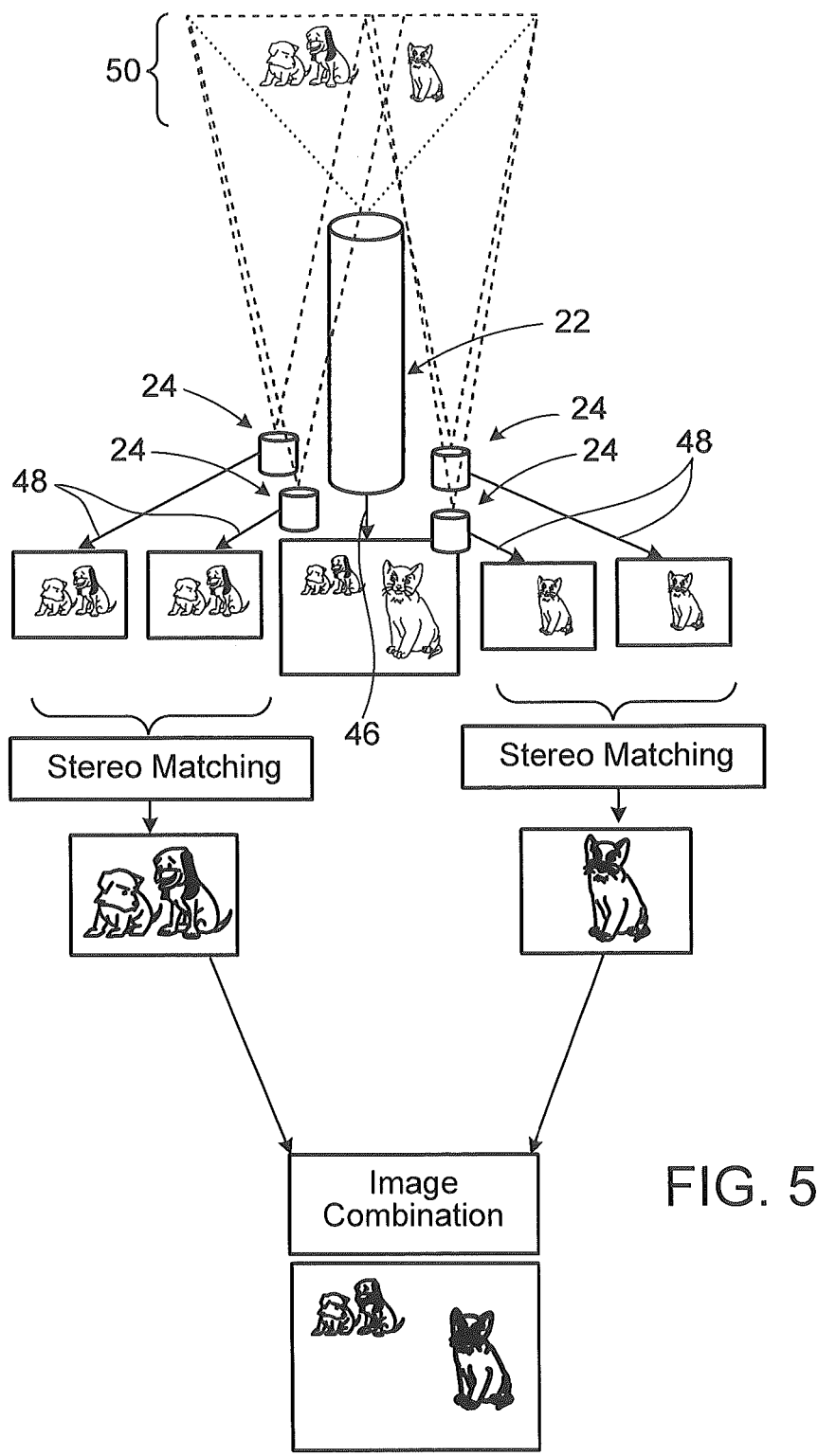
FIG. 5 illustrates an example for capturing high-resolution image and depth information using a primary camera and secondary cameras on the same sensor.

In some implementations, a second secondary camera can be provided, for example, near the primary camera. Some implementations may include even more than two secondary cameras, which can help produce better resolution and/or more accurate depth information. An example is illustrated in FIG. 5, which shows a primary camera 22 to receive high-resolution image information 46 of an object 50 (e.g., a scene or a hand gesture) and four secondary cameras 24 to receive depth information 48 of the object 50. Here too, different ones of the secondary cameras may have different wavelength filters, polarization filters and/or apertures sizes associated with them. Processing circuitry, which can be mounted, for example, on the PCB 36, can receive and process the high-resolution image and depth information from the cameras 22, 24.

As described in the foregoing examples, in some cases it is desirable that the lens barrel for the primary camera 22 not substantially obstruct the individual FOV 29B of the secondary cameras 24. Nevertheless, in some implementations, even if the FOV 29B of each individual secondary camera 24 is partially obstructed by the lens barrel 26 (or 26A) of the primary camera 22, it can be advantageous to design the cameras such that the combined FOV of the secondary cameras 24 encompasses at least the same FOV as the primary camera 22.

Figure 6A:
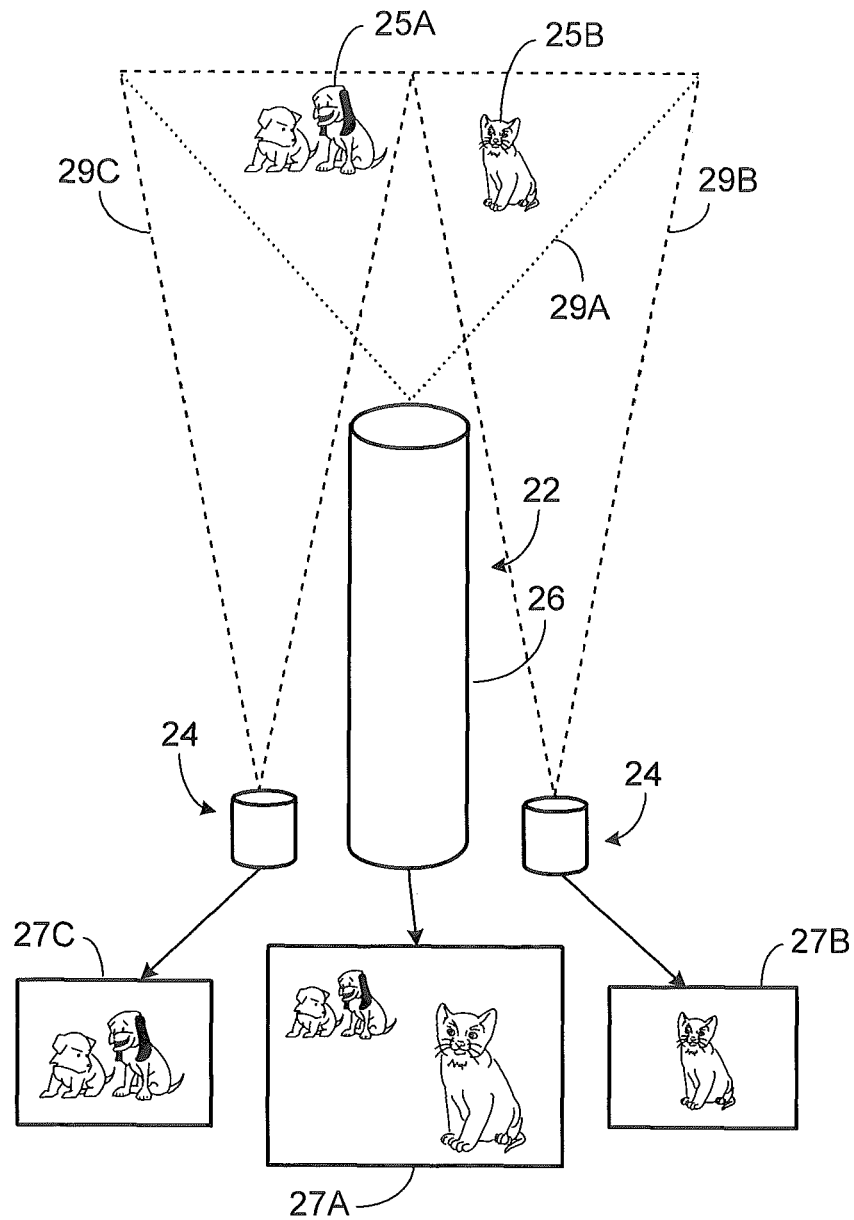
FIG. 6A illustrates an example of an image sensor module in which the collective FOV of the secondary cameras at least encompasses the FOV of the primary camera.
Figure 6B:
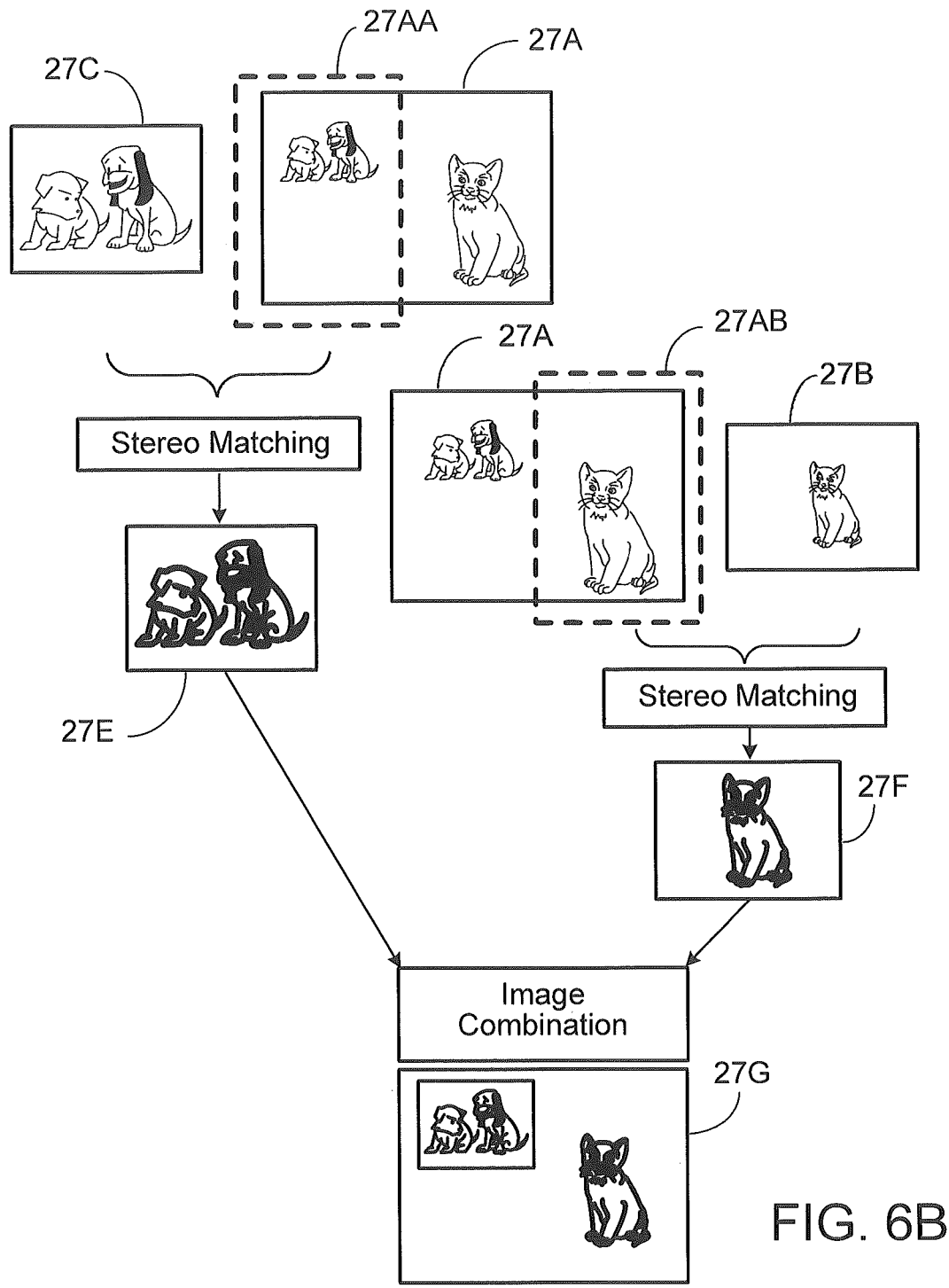
FIG. 6B illustrates various image processing steps associated with the example of FIG. 6A.

FIG. 6A illustrates an example, in which the individual FOV 29B, 29C of each secondary camera 24 is smaller than the FOV 29A of the primary camera 22. Nevertheless, the combined FOV (i.e., 29B and 29C) of the secondary cameras 24 encompasses at least the FOV 29A of the primary camera 22. In the illustrated example, the FOV 29A of the primary camera 22 encompasses first and second items 25A, 25B. Thus, the image 27A obtained from the primary camera 22 is a high-resolution 2-D image that includes both items 25A and 25B. On the other hand, the FOV 29C of one secondary camera 24 encompasses only the first item 25A, whereas the FOV 29B of the other secondary camera 24 encompasses only the second item 25B. Thus, each respective image 27B, 27C obtained from the secondary cameras 24 is a lower-resolution 2-D image that includes only one of the items 25A, 25B. Simultaneously acquired images from the secondary cameras 24 and primary camera 22 then can be processed to produce a 3-D image or other depth information, as illustrated, for example, in FIG. 6B. The processing can be performed via well-known stereo-matching algorithms. In this case, however, the higher resolution image acquired by the primary camera 22 also is used for the acquisition of a 3-D image or other depth information. In particular, regions 27AA and 27AB in the primary image 27A that correspond to the respective secondary images 27B, 27C are used for matching to obtain partial 3-D images 27E, 27F or other depth information. The partial 3-D images 27E, 27F then can be combined, for example, to obtain a reconstructed 3-D image 27G.

Figure 7A:
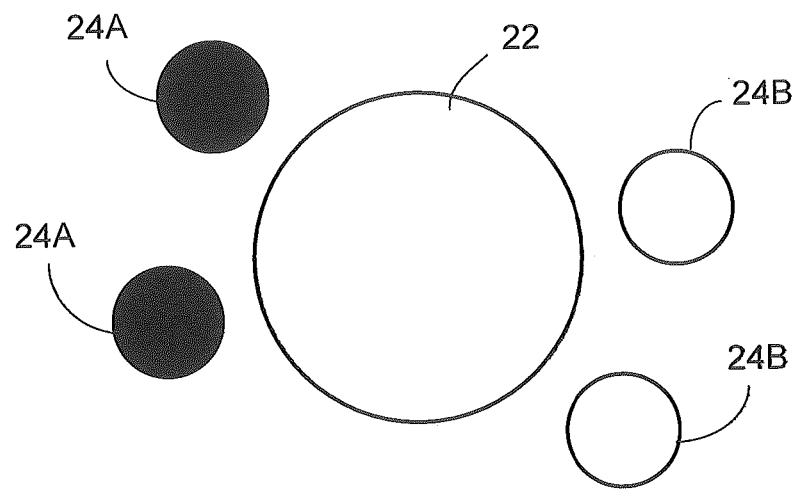
FIGS. 7A and 7B are top views of additional image sensor layouts.
Figure 7B:
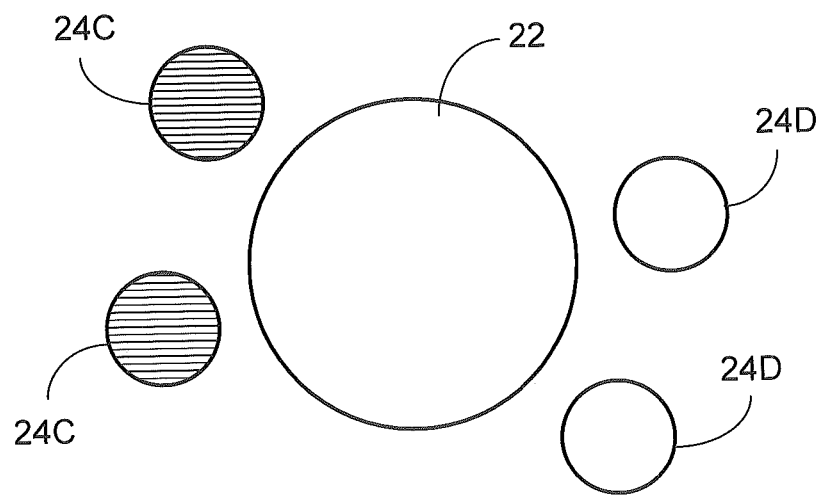

The number of secondary cameras on the same sensor as the primary camera 22 can vary depending on the implementation. In some cases, a single secondary camera is combined on the same sensor chip as the primary camera. For example, an IR-sensitive secondary camera can be combined on the same sensor chip as a RGB-sensitive primary camera. In other cases, there may be multiple secondary cameras 24 adjacent the primary camera 22. In some implementations, the secondary cameras are provided with different types of wavelength filters. For example as shown in FIG. 7A, some secondary cameras 24A can collect RGB and/or other visible light, and other secondary cameras 24B can collect IR light. The optical assembly (e.g., lens stack) of each secondary camera can be optimized for a particular wavelength of light. In some instances, information from the visible light secondary cameras 24B is used in normal ambient lighting conditions, whereas the IR and visible light secondary cameras 24A, 24B are used in low-ambient light conditions. In some implementations, as indicated by FIG. 7B, instead of (or in addition to) wavelength filters, different ones of the secondary cameras 24C, 24D can include different polarizing filters or different aperture sizes. Processing circuitry (mounted, for example, on a PCB) can receive and process the high-resolution image and depth information from the cameras. The foregoing features and combinations of features can be applied to any of the modules described in this disclosure.

In some implementations, a primary lens camera 22 can be combined on the same sensor with a single secondary camera. The primary camera 22 can be used to collect a high-resolution image, but also can serve to provide depth information to the processing circuitry. Thus, in this case, the primary camera 22 and the single secondary camera 24 together provide depth (e.g., stereo) information. Even if the FOV of the individual secondary camera 24 is partially obstructed by the lens barrel of the primary camera 22, collectively the two cameras 22, 24 encompass at least the same FOV as the primary camera 22. There should, however, be at least some overlap in the FOV of the two cameras 22, 24 so that depth information can be acquired by the processing circuitry.

Figure 8:
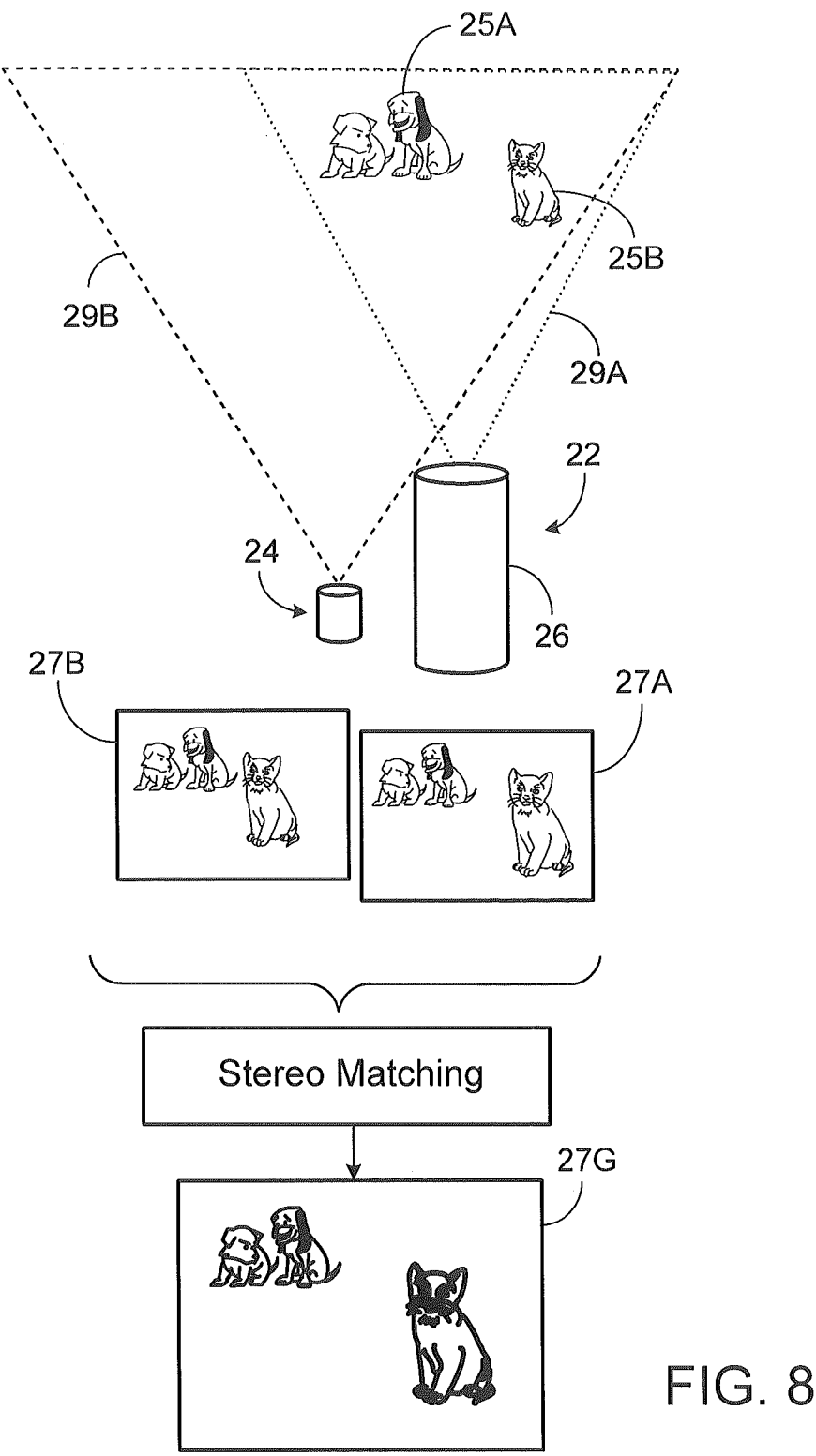
FIG. 8 illustrates an example of an image sensor module in which depth information is obtained based on images from a primary camera and a single secondary camera.

FIG. 8 illustrates an example of an image sensor module in which depth information is obtained from a primary camera 22 and a single secondary camera 24. In the illustrated example, the FOV 29B of the secondary camera 24 encompasses at least the FOV 29A of the primary camera 22. The lens barrel 26 of the primary camera 22 can be implemented, for example, as described above in connection with FIGS. 3A-3B or FIG. 4. In the illustrated example, the FOV 29A of the primary camera 22 and the FOV 29B of the secondary camera 24 each encompasses first and second items 25A, 25B. Thus, the image 27A obtained from the primary camera 22 is a high-resolution 2-D image that includes both items 25A and 25B, and the image 27B obtained from the single secondary camera 24 is a lower-resolution 2-D image that includes both items 25A, 25B. Simultaneously acquired images from the primary camera 22 and the secondary camera 24 can be processed using well-known stereo-matching algorithms to produce a 3-D image 27G or other depth information. In addition, a higher resolution image can be acquired by the primary camera 22.

Figure 9:
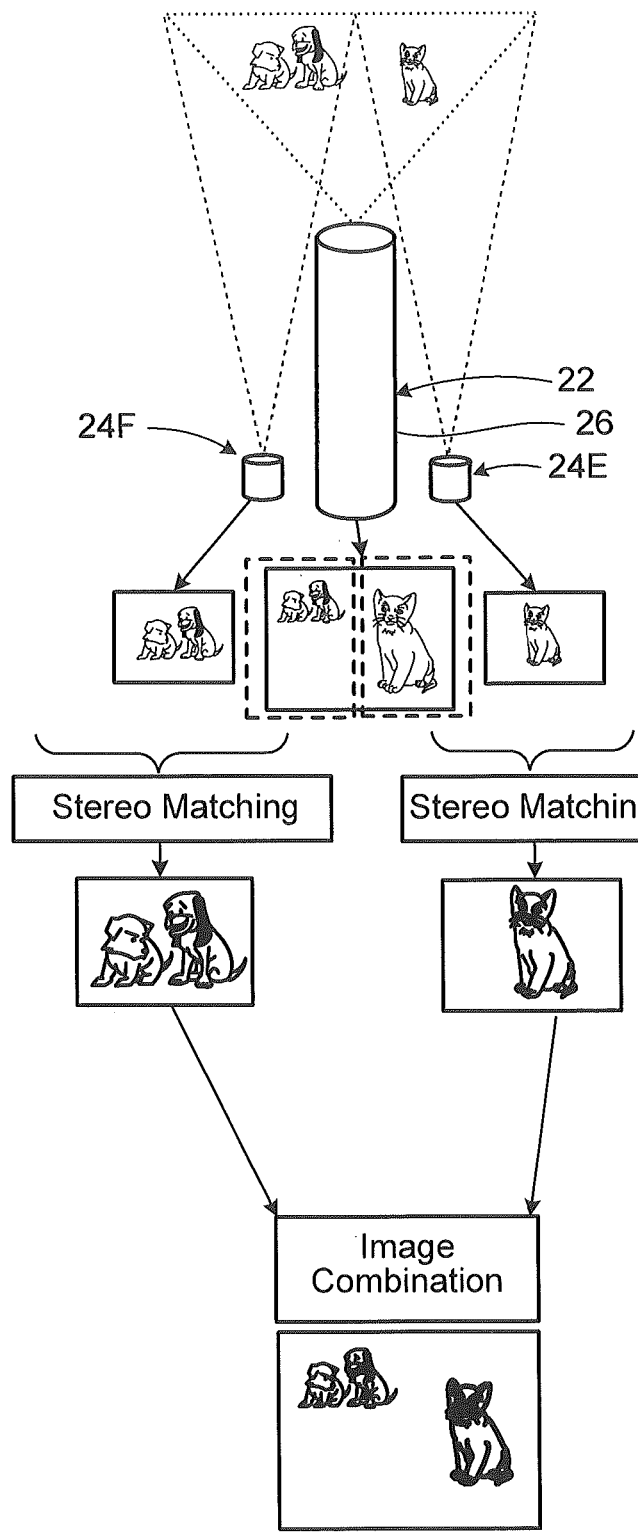
FIG. 9 illustrates a further example of an image sensor module in which depth information is obtained based on images from a primary camera and individual secondary cameras.

In some instances, the assembly includes a primary camera and multiple secondary cameras, where the processing circuitry is configured to acquire depth information based on signals from each respective individual one of the secondary cameras in combination with the signals from the primary camera 22. An example is illustrated in FIG. 9, which shows two secondary cameras 24E and 24F. In such situations, processing circuitry can obtain depth information based on images acquired simultaneously from the primary camera 22 and the secondary camera 24E. The processing circuitry also can obtain depth information based on images acquired simultaneously from the primary camera and secondary camera 24F. Different ones of the secondary cameras 24E, 24F may have different wavelength filters, polarization filters and/or apertures sizes associated with them. Processing circuitry (mounted, for example, on a PCB) can receive and process the high-resolution image and depth information from the cameras.

In some cases, the processing circuitry can derive depth information both from two or more secondary cameras, as well as from the combination of the primary camera 22 and one or more of the secondary cameras 24E, 24F. Thus, in the example of FIG. 9, the processing circuitry can be configured to derive depth information, for example, based on signals (i) from the two (or more) secondary cameras 24E, 24F, (ii) from the primary camera 22 and a first one of the secondary cameras 24E, and/or (iii) from the primary camera 22 and the second one of the secondary cameras 24F.

In some instances, the combined FOV of the secondary cameras 24 is substantially the same as the FOV of the primary camera 22. In other implementations, however, the combined FOV of the secondary cameras 24 may be wider than the FOV of the primary camera 22.

Figure 10:
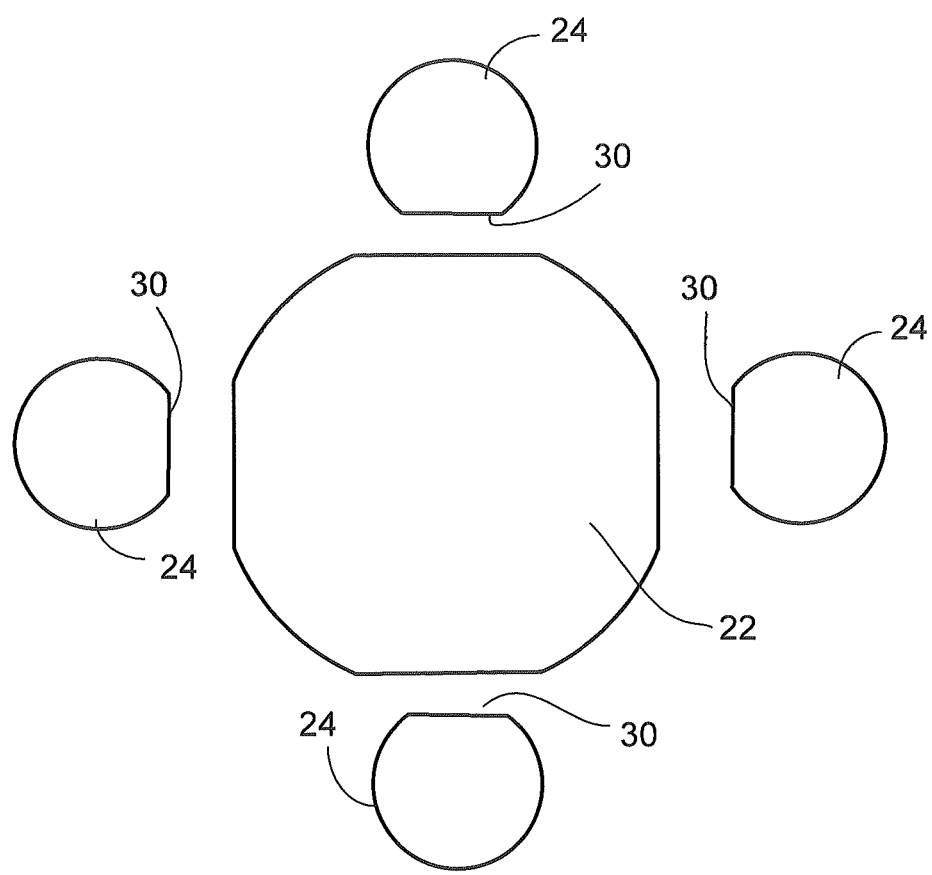
FIG. 10 is a top view of another image sensor layout.

In some cases, it may be desirable to form the lens barrel for the secondary cameras in a manner similar to the lens barrel 26 described above in FIG. 3A (i.e., such that the lens barrel has one or more substantially flat, planar sections 30). An example is illustrated in FIG. 10. Providing a flat, planar section 30 on the side of a generally cylindrical lens barrel for each secondary camera can help reduce the overall footprint of the image sensor module and can allow the secondary camera 24 to be brought into even closer proximity to the primary camera 22. Such a lens barrel for the secondary camera(s) 24 can be used in any of the implementations described above.

In the various techniques described above, stereo matching may be hindered by low ambient-light conditions. Specifically, low-ambient light reduces object contrast. Stereo matching pixels in a plurality of images of objects with low contrast is difficult. However, a light pattern projected onto an object may provide the additional contrast needed to facilitate stereo matching. Accordingly, in addition to a primary camera and secondary cameras, a light pattern projection unit may be provided such that the secondary cameras are sensitive to the wavelengths of the projected pattern. The projection unit can project an IR or other optical pattern, for example, onto a three-dimensional (3D) object. The pattern can be, for example, regular (e.g., grid) or irregular (e.g., speckles). The pattern projection unit can include a light source and a pattern generator, and can be mounted on the same PCB as the imager sensor. Thus, for example, an image sensor module may include an IR light projection unit, and a sensor chip that provides an RGB-sensitive primary camera and an IR-sensitive secondary camera. In some cases, there may be multiple secondary cameras, each of which is sensitive to the same or different wavelength(s). Further, some implementations may include multiple light projection units. Moreover, as the baseline distance between each primary and/or secondary cameras and the projection unit or units is known (and can be stored by the processing circuitry), any implementation that includes at least one light projection unit may be used additionally or alternatively to determine depth of an object via triangulation. Examples of these and other implementations are described in greater detail below.

Figure 11:
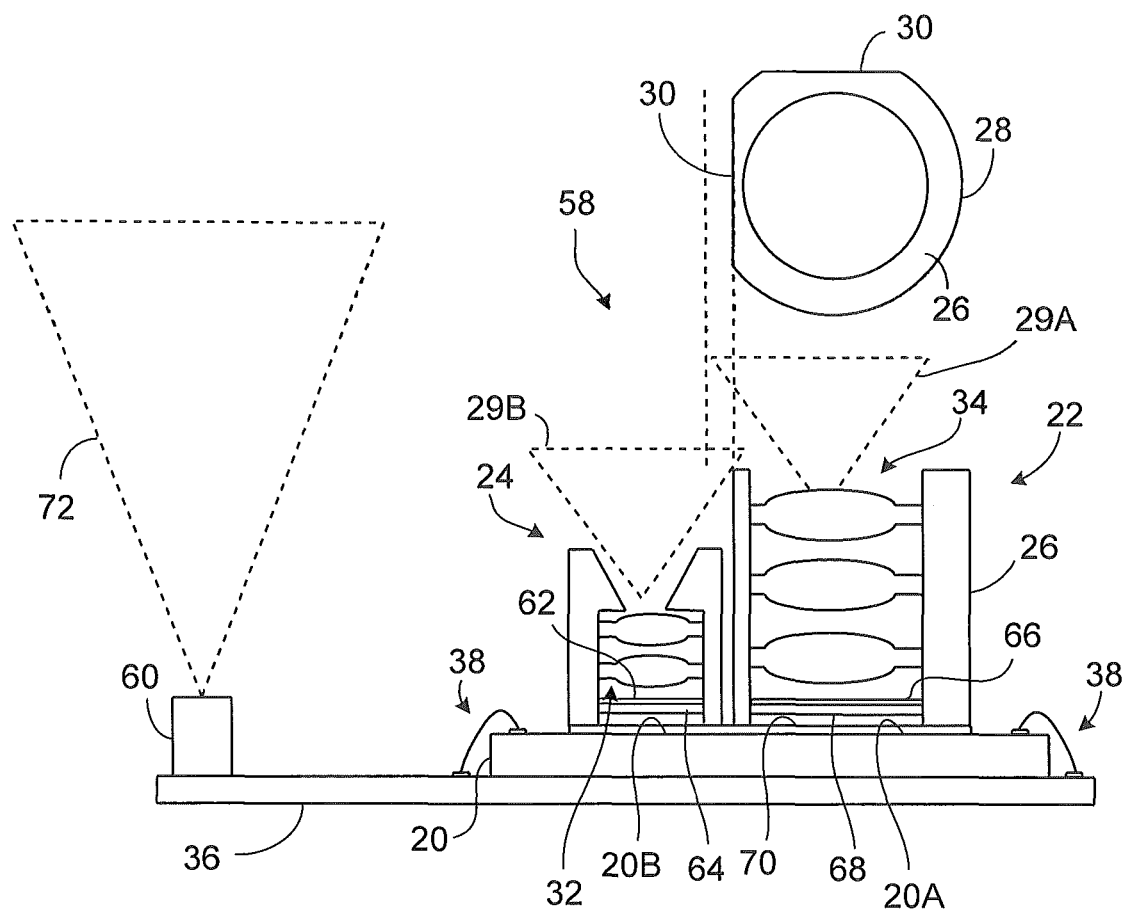
FIG. 11 illustrates an image sensor module including features for enhanced infra-red light detection.

FIG. 11 illustrates an example of an image sensor module 58 mounted on the same substrate 36 as a light projector 60 (e.g., a laser diode or vertical cavity surface emitting laser (VCSEL)). The image sensor module includes features that facilitate the collection of projected infra-red (IR) structured light and visible light in the same secondary camera(s) 24 without resulting in IR-washout in the secondary camera(s). As shown in FIG. 11, the light projector 60 emits a predetermined narrow range of wavelengths in the IR part of the spectrum. For example, the light projector 60 in some cases may emit light in the range of about 850 nm±10 nm, or in the range of about 830 nm±10 nm, or in the range of about 940 nm±10 nm. Different wavelengths and ranges may be appropriate for other implementations depending, for example, on the availability of particular laser diodes or VCSELs. The structured light 72 emitted by the light projector 60 may be reflected, for example, by an object such that the reflected light is directed toward the image sensor module. In the module of FIG. 11, each secondary camera 24 includes a band-pass filter 62 disposed, for example, on a cover glass 64. The band-pass filter 62 can be designed to filter substantially all IR light except for IR light emitted by the light projector 60. The band-pass filter 62 preferably permits passage of a slightly wider range of wavelengths than is emitted by the light projector 60. Further, the wider wavelength range that the band-pass filter 62 allows to pass should be centered at slightly longer wavelengths relative to the narrow range of wavelength emitted by the light projector 60. This latter feature is inherent, for example, in dielectric-type band-pass filters, where the peak (passed) wavelength shifts to shorter wavelengths as the angle of incidence of impinging light increases. On the other hand, the primary camera 22 includes an IR-cut filter 66 disposed, for example, on a cover glass 68. The IR-cut filter 66 is designed to filter substantially all IR light such that almost no IR light reaches the photosensitive region 20A of a sensor 20. Thus, the IR-cut filter preferably allows only visible light to pass. The photosensitive regions 20A, 20B of both the primary and secondary cameras 22, 24 can be covered, for example, by the same color filter array 70 (e.g., a Bayer-type color filter array).

The module of FIG. 11 allows the same secondary camera 24 to collect projected IR structured light as well as visible light without IR-washout. The secondary cameras 24 can be used, for example, to collect stereo images in various scenarios. For example, in some implementations, the secondary cameras 24 can collect IR light that has additional texture (i.e., light projected by the light projector 60). In other implementations, the secondary cameras 24 can be used under ambient light conditions (e.g., outside, where there is a significant amount of natural sunlight including IR radiation). Alternatively, in either scenario, projected structured light may be used to determine depth via triangulation.

In some implementations, a primary camera 22 with an IR-cut filter 66 and a single secondary camera 24 with a band-pass filter 62 can be used to acquire depth information. Here too, the secondary camera 24 would be used to sense, for example, infra-red or other light emitted by the light source (e.g., projection unit(s)) and reflected off an object in the scene. In this case, however, the depth information is not obtained from stereo images; instead, a regular pattern can be projected from the light projector 60, and an image of the distorted pattern sensed by the secondary camera 24 would provide depth information. Alternatively, the projected structured light may be used to determine depth via triangulation.

Figure 12A:
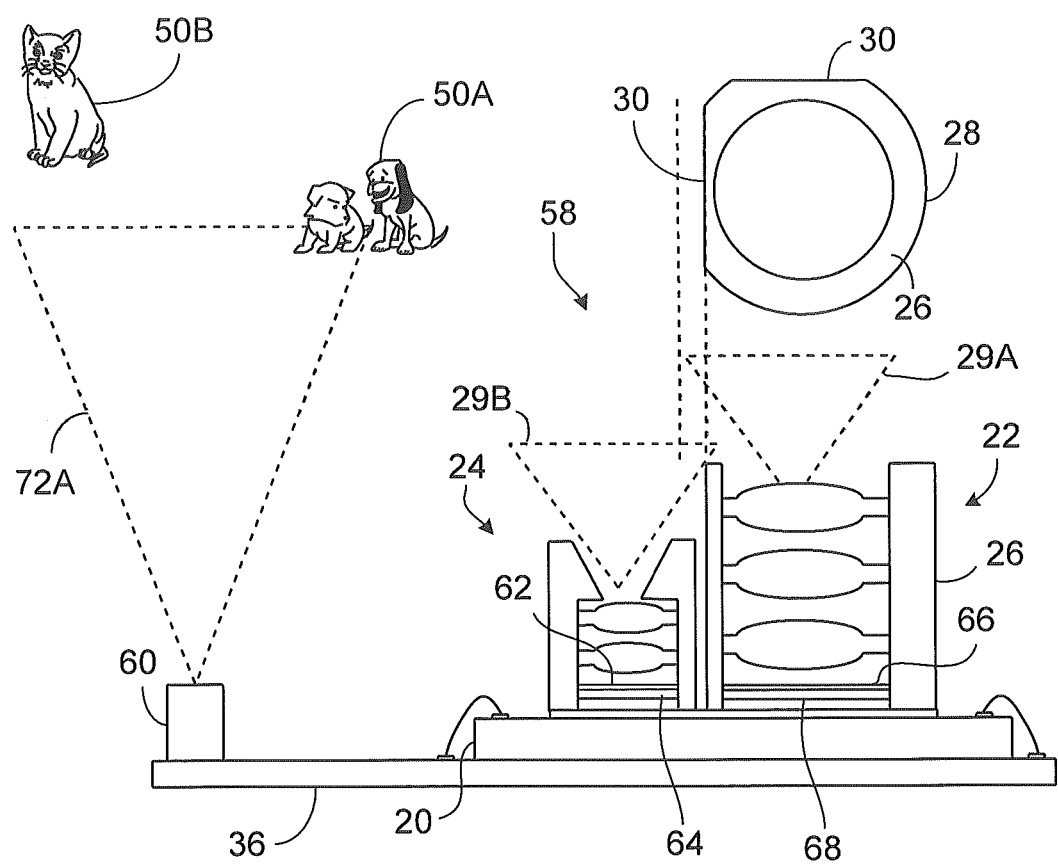
FIGS. 12A and 12B illustrate an image sensor module operable in a modulated intensity mode.
Figure 12B:
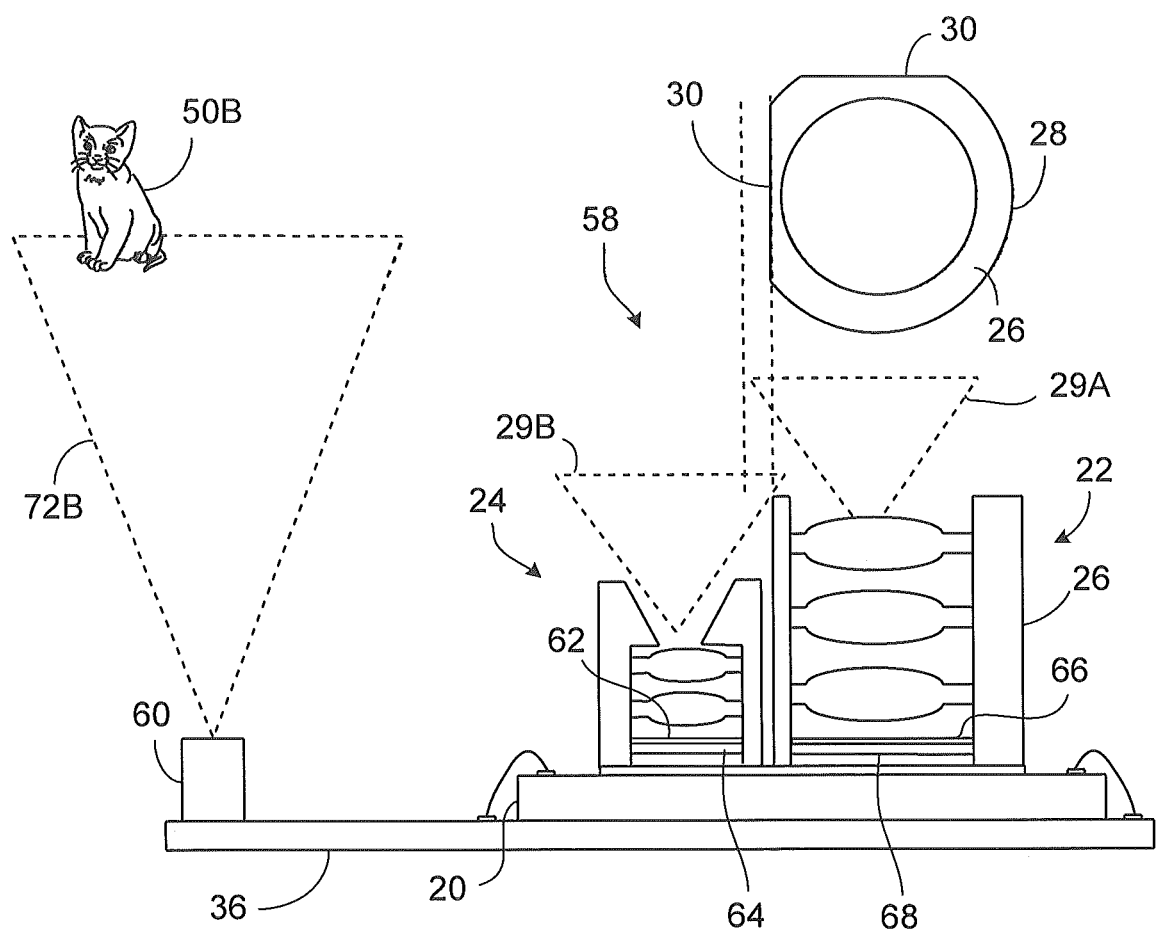

In some instances, the optical power (or intensity) output by the light projector 60 can be modulated to facilitate serial image capture using different amounts of projected power. For example, the light projector 60 can be operable in a low-power (or low-intensity) mode and in a high-power (or high-intensity) mode. The light projector 60 can switch between the low-power and high-power modes, and the image sensor module 58 can capture one or more images during each mode of operation. For example, as shown in FIG. 12A, the light projector 60 can be operated in a low-power mode such that a low-intensity IR pattern 72A is projected. Such a low-intensity pattern can be used to provide good definition (i.e., contrast) for a scene or object 50A that is relatively close to the module 58. As shown in FIG. 12B, the light projector 60 can be operated in a high-power mode such that a high-intensity IR pattern 72B is projected. Such a high-intensity pattern can be used to provide good definition (i.e., contrast) for an image 50B that is farther away from the module 58. In some cases, output from an ambient light sensor, such as those described below in connection with FIGS. 14-17, can be used to determine whether the light projector 60 should be operated in a low-power or high-power mode. A processing unit can acquire the images detected by the module 58 as the light projector 60 modulates between the high-power and low-power modes. The processing unit can generate a reconstructed image, using known techniques, based at least in part on the images sensed during the low-power and high-power modes. The reconstructed image can include increased depth. In some cases, one or more images may be acquired during the low-power mode, and then one or more images can be acquired during the high-power mode. In other cases, one or more images may be acquired during the high-power mode, and subsequently one or more images may be acquired during the low-power mode. Further, in some cases, for a scene with one or more objects only at relatively close distances (i.e., no far-off objects), the low-intensity projection mode alone can be used, thereby saving power.

Figure 13A:
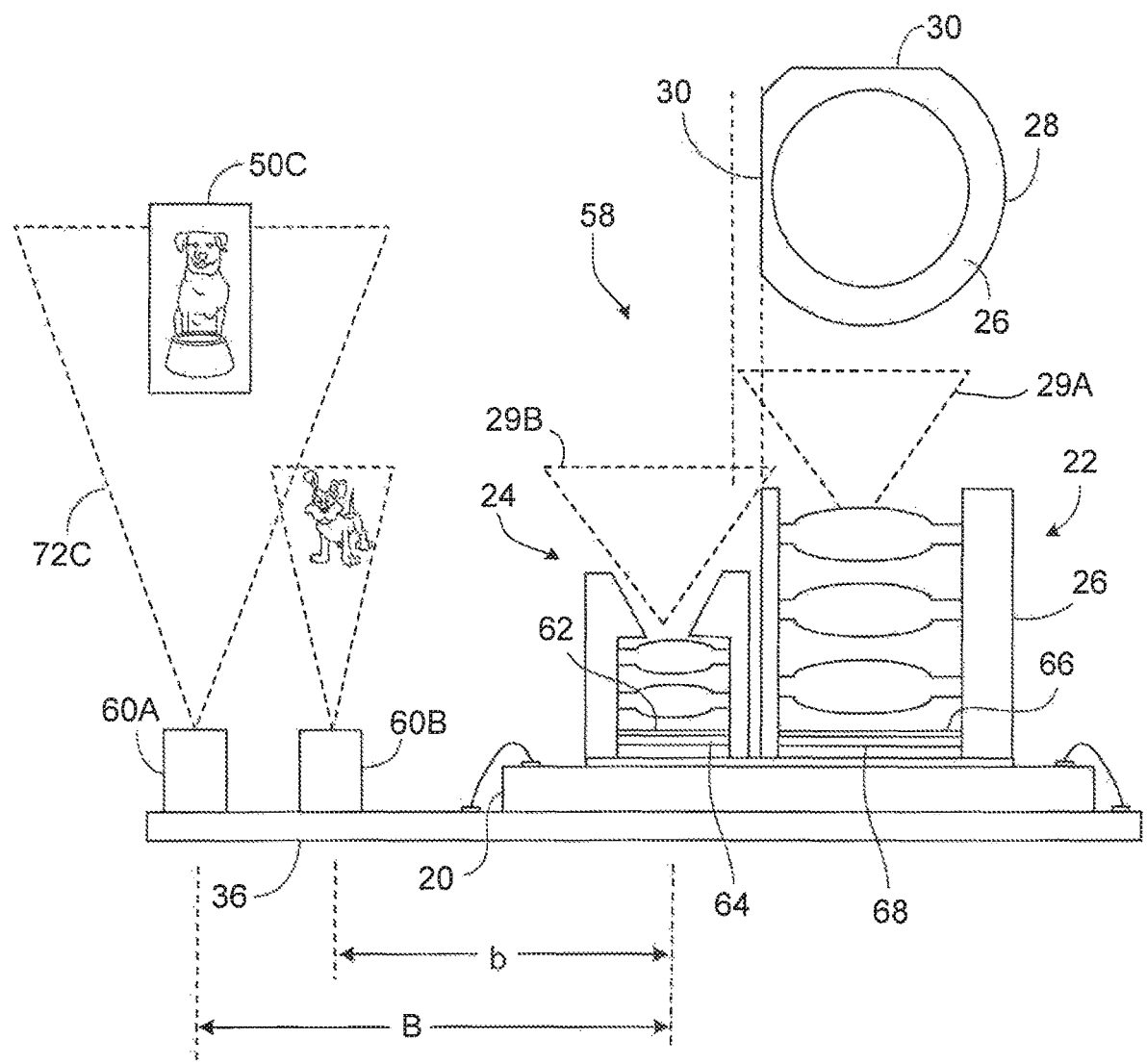
FIG. 13A illustrates an image sensor module including multiple light projectors that operable at different intensities from one another.

In some instances, as shown in FIG. 13A, rather than providing a single (variable-power) projector, multiple light projectors 60A, 60B may be provided wherein each of the multiple light projectors operates at a different power level (e.g., a high-power/intensity light projector 60A and a low-power/intensity light projector 60B).

Figure 13B:
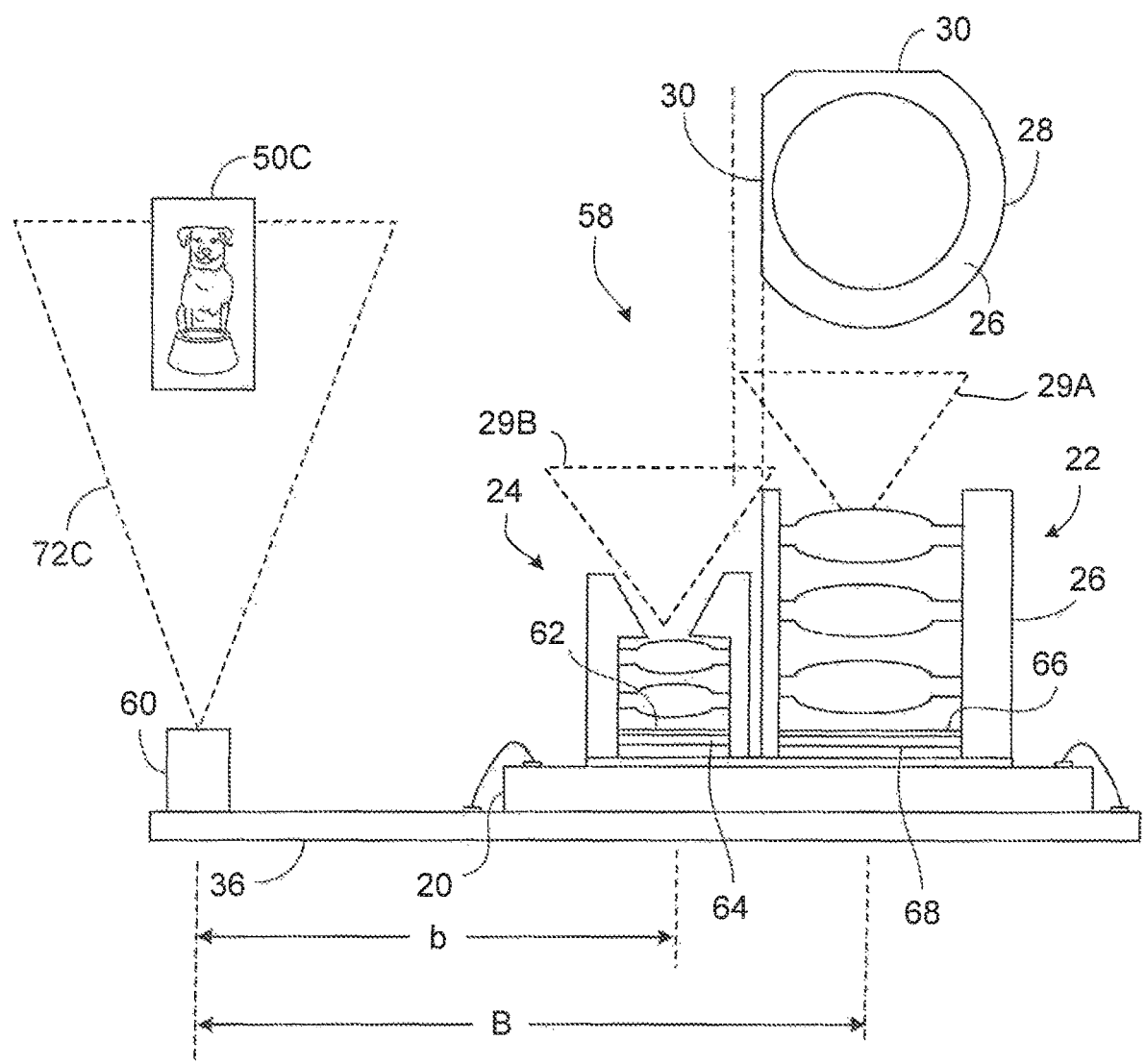
FIGS. 13B and 13C illustrate an image sensor module operable in a serial image acquisition mode.

In some implementations, instead of obtaining serial images as the light projection unit 60 is modulated between two different non-zero power modes, the module 58 can be used to obtain serial images as the light projection unit 60 is switched between an ON mode and an OFF mode. For example, as shown in FIG. 13B, the module 58 can obtain a first image of a scene or object 50C while the light projection unit 60 is on and projects an IR light pattern 72C.

Figure 13C:
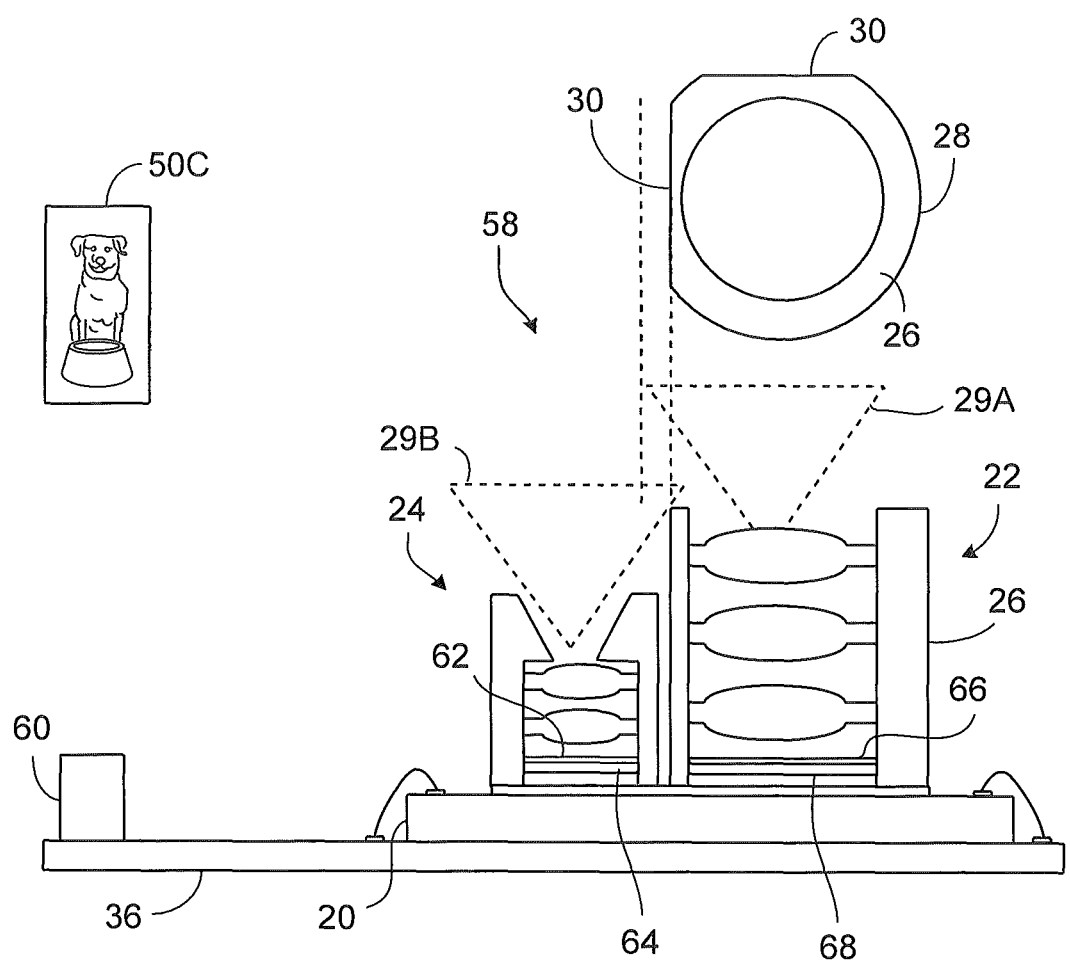

As further shown in FIG. 13C, in some cases, the module 58 can be operable to obtain a second image of the scene or object 50C while the light projector 60 is off (i.e., no IR pattern is projected onto the object 50C). The image detected while the light projector 60 projects the IR pattern 72C can be used, for example, to improve stereo matching. The image detected while the IR pattern is not projected can be used, for example, to provide a better visible-light image via the secondary camera(s) 24 without influence from the projected IR pattern 72C. A processing unit then can generate a reconstructed image, using known techniques. The reconstructed image can be of high-quality. The foregoing serial image acquisition technique can be advantageous under different lighting conditions or different texture of the scene or object. For example, the techniques can be used if part of the scene or object has little or no texture, whereas another part of the scene or object has sufficient texture to permit stereo matching without using the projected IR pattern.

Although the illustrated examples in FIGS. 11, 12A-12B and 13A-13C show the primary and secondary cameras 22, 24 as having lens barrels similar to the design of FIG. 3B, in other implementations, the design of the lens barrels may differ. For example, the configurations of FIG. 4, 4A, 4B or 4C can be used in combination with the additional features of FIG. 11, 12A-12B or 13A-13C.

Substantial advantages may be realized when multiple camera-projection unit baselines are present. For example, multiple camera-projection unit baselines can permit different ranges of optimal depth associated with each imager-projector baseline. Alternatively, where the optimal ranges overlap, the data from each camera may be correlated to improve accuracy. Where optimal ranges overlap, the data associated with each baseline may be used to determine depth/distance; consequently, if a discrepancy arises (that is, above a certain threshold) i) a user may be prompted to execute a calibration procedure, and/or ii) the collected data associated with each baseline, particularly data derived from multiple distances, may be used to calibrate the module automatically. In some implementations, the secondary cameras can be configured to be optimized for different depths in the object. Examples of the some of the foregoing features are described in the following paragraphs.

Figure 14A:
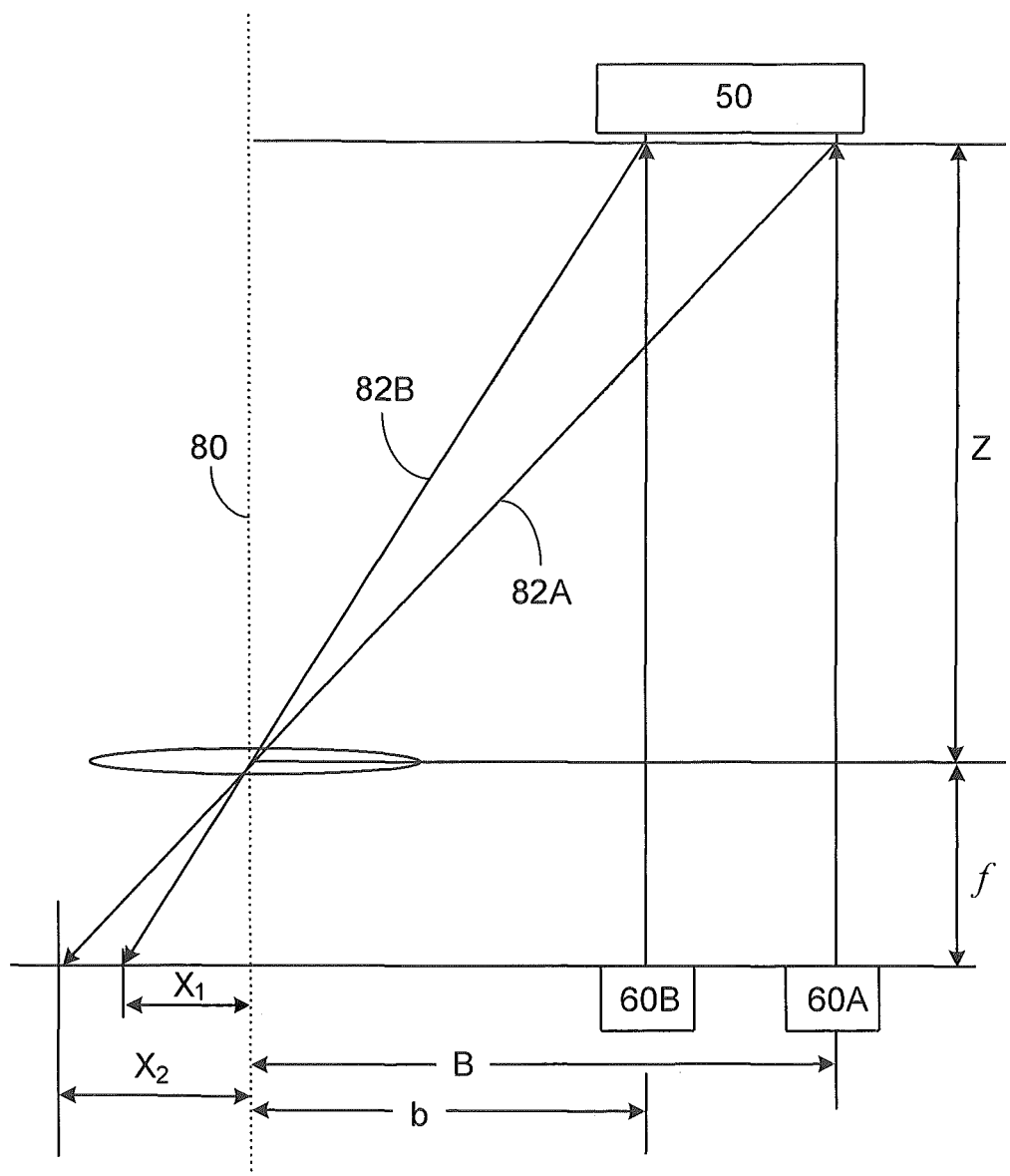
Figure 14E:
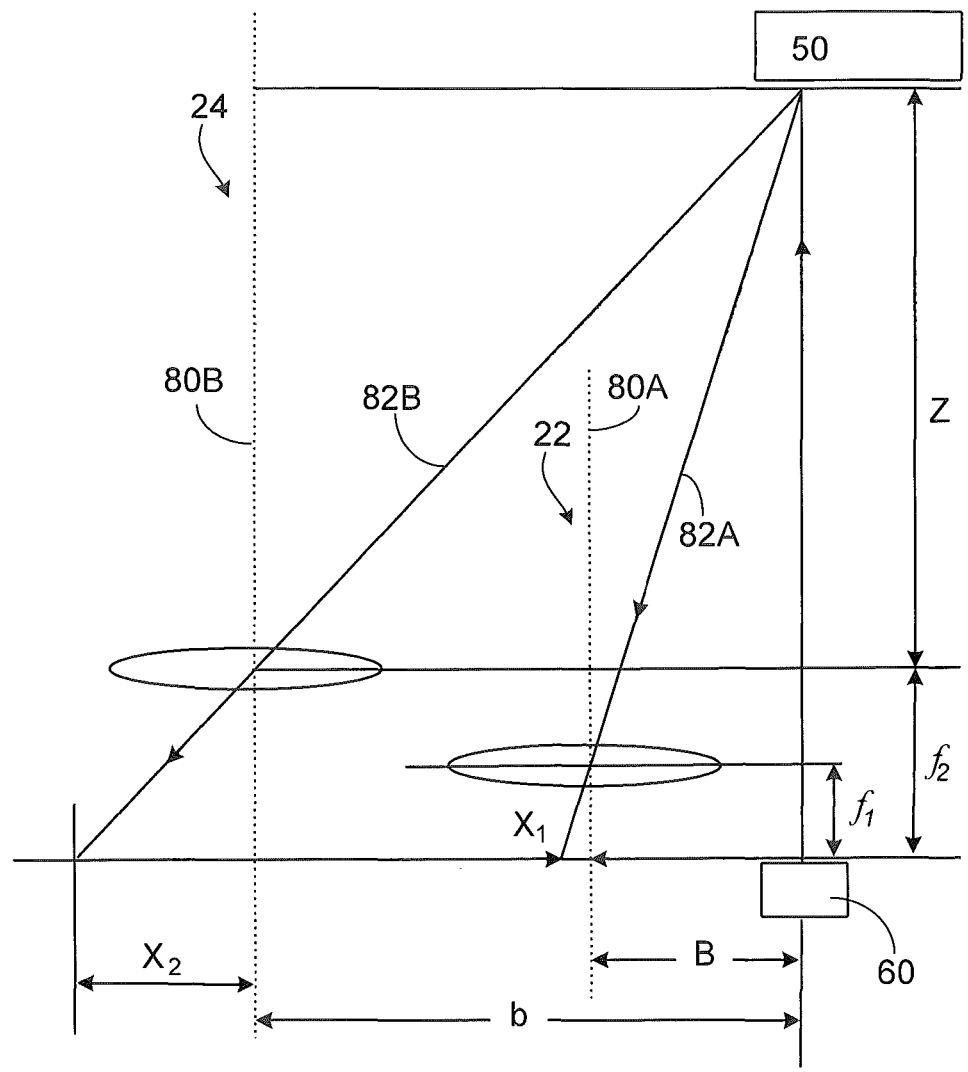
FIG. 14E illustrates an image sensor module including multiple channels having different focal lengths.

Implementations that include multiple light projection units can, in some cases, provide an additional benefit in that the different light projectors 60A, 60B may have different imager-projection unit baselines (i.e., "B" and "b") that permit different ranges of optimal depth associated with each imager-projector baseline. As illustrated, for example, by FIG. 14A, the first light projection unit 60A may be optimal when the object to be detected is located within a first distance range such that the light 82A reflected by the object 50 falls within the sensor area, whereas the second light projection unit 60B may be optimal when the object 50 to be detected is within a second different distance range such that the light 82B reflected by the object falls within the sensor area. In FIG. 14A, 'Z' is the object's depth and 'f' is the focal length; '$x_1$' is the distance between the central axis 80 of the optical channel and the peak-signal pixel detecting light from the second light projector 60B; and '$x_2$' is the distance between the central axis 80 of the optical channel and the peak-signal pixel detecting light from the first light projector 60A. Processing circuitry in the module can use triangulation techniques to calculate the object's depth. If the depth ranges for the two light projections units 60A, 60B overlap such that the object's depth ('Z') can be obtained using either baseline "B" or "b", the peak-pixel signals for both light projectors can be correlated so as to improve accuracy of triangulation calculations or for calibration. The foregoing advantages can be obtained even if both projectors 60A, 60B project light at the same intensity.

Providing optical channels that have different baselines (e.g., "B" or "b") from one another also can be advantageous. For example, each of the baselines may have an optimal depth range for detecting an object outside the module. Thus, as shown in FIG. 14B, when the object 50 to be detected is located within a first distance range (e.g., at a distance $Z_1$), the light 82A reflected by the object may fall within the sensor area 20A of the first channel 22, whereas light 82B reflected by the object may fall outside the sensor area 20B of the second channel 24. On the other hand, when the object 50 is within a second different distance range (e.g., at a distance $Z_2$), light 82A, 82B reflected by the object may fall within the sensor areas 20A, 20B of both channels 22, 24 (see FIG. 14C). Nevertheless, the resolution of the first channel 22 may be unacceptably low such that it cannot be used to calculate the object's depth. In that case, data from the second channel 24 alone may be used to calculate the object's depth. If the depth values for both channels overlap such that the object's depth can be calculated using either baseline "B" or "b" (e.g., when the object is at a distance $Z_3$; see FIG. 14D), the data from both sensor areas 20A, 20B can be correlated so as to improve accuracy of triangulation calculations or for calibration. In FIGS. 14B-14D, 'f' is the focal length; '$x_1$' is the distance from a central axis 80A of the first channel 22 to the peak-signal pixel for that channel; and '$x_2$' is the distance from a central axis 80B of the second channel 24 to the peak-signal pixel for that channel. For clarity, the lenses are omitted in FIGS. 14B, 14C and 14D. Some of the foregoing advantages can be obtained even if the light projection unit 60 is operable, when turned on, to project light at only a single non-zero intensity.

In some implementations, channels having different focal lengths from one another can be used, for example, to expand the range of depth detection. As shown, for example, in FIG. 14E, the focal length of the first channel 22 is $f_1$, whereas the focal length of the second channel 24 is $f_2$. Depending on the distance (Z) of the object 50, signals from one or the other of the channels 22, 24 may be used by the processing circuitry more effectively to calculate the object's depth. If the depth values for both channels overlap such that the object's depth can be calculated using either baseline "B" or "b", the data from both channels can be correlated so as to improve accuracy of triangulation calculations or for calibration.

Figure 15:
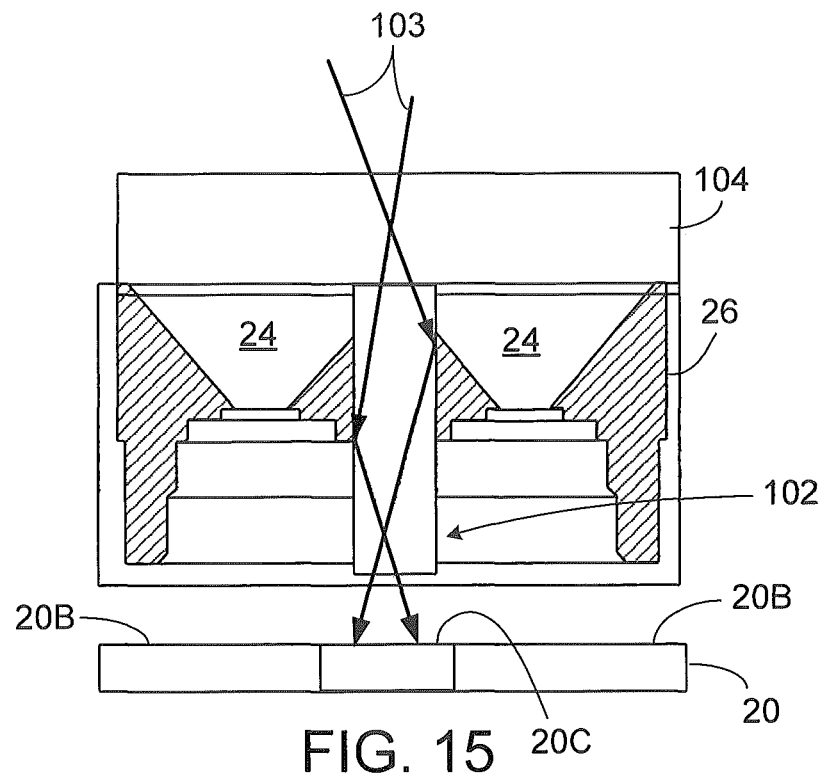
FIG. 15 is a cross-sectional view showing an example of an image sensor module that provides ambient light sensing.

In some implementations, a portion of the sensor 20 is dedicated to ambient light sensing (ALS). The ambient light sensing can be integrated into any of the previously-described modules. For example, as illustrated in FIG. 15, some of the sensor's pixels 20C may be sensitive to visible, IR and/or UV light to allow sensing of ambient light conditions. Thus, the pixels for the ambient light sensor 20C can be integrated into the same image sensor 20 as the photosensitive regions 20A, 20B for the primary and secondary imagers 22, 24. In some implementations, the pixels for the ambient light sensor are customized (e.g. binned, pitch/size increased) so as to increase sensitivity. In some cases, the ambient light sensor may include a light guide 102 such as a cylindrical glass light rod with a roughened surface so that light impinging on its surface becomes diffuse. The roughened surface may be, for example, at the object side of the light rod. In some instances, the light guide for the ambient light sensor includes a tube with reflective interior walls. In some instances, the light guide for the ambient light sensor may be a transparent (e.g., glass) truncated cone, where the smaller diameter (truncated end) is immediately adjacent the ambient light sensor pixel(s). The light guide 102 can be attached, for example, to a cover glass 104 disposed over the optical channels. The ambient light 103 is directed by the light guide onto the ambient light sensor pixels 20C. In some implementations, the ambient light sensor includes a lens structure to enhance light collection. Preferably, the field-of-view (FOV) of the ambient light sensor is at least 120° (i.e., between 120 and 180 degrees).

Figure 16:
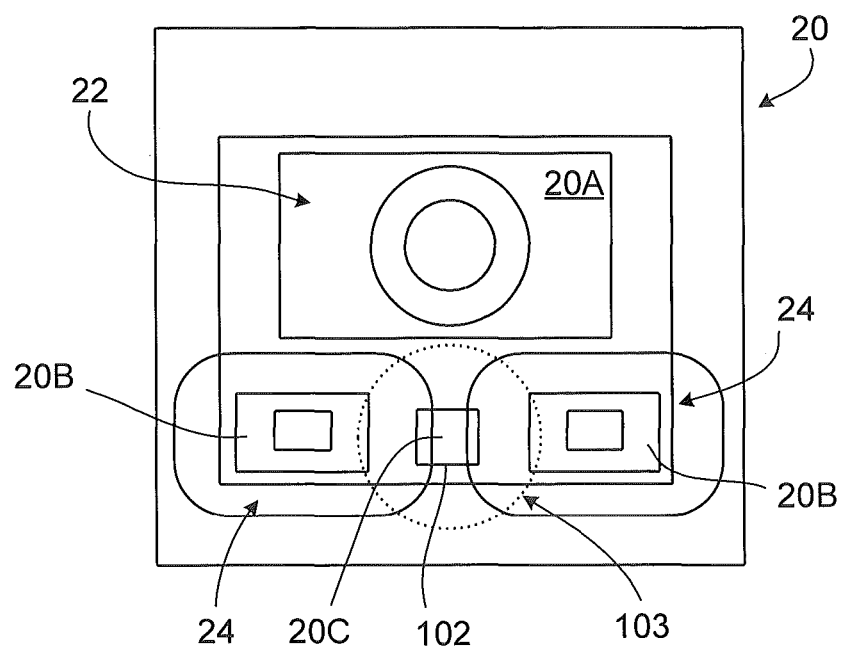
FIG. 16 is a top view showing an example of an image sensor module that provides ambient light sensing.

FIG. 16 is a top view that illustrates an example of the location of the light guide 102 for the ambient light sensor relative to the positions of the primary and secondary cameras 22, 24. Part of the lens barrel 26 between the secondary imagers 24 can be cut away so as to increase the FOV of the ambient light sensor (see dotted line 103 in FIG. 16).

Figure 17:
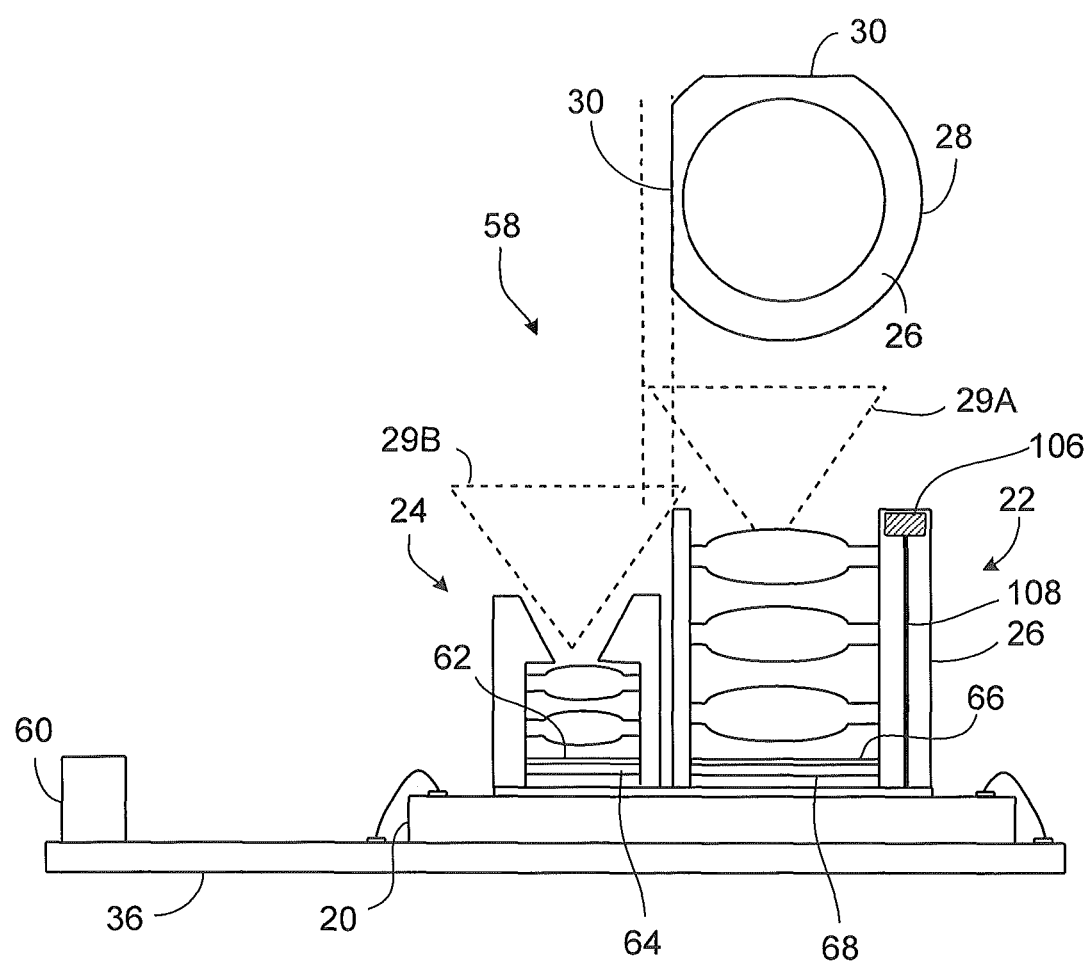
FIG. 17 illustrates another example of an image sensor module that provides ambient light sensing.

In some cases, the ambient light sensor is implemented as a discrete sensor 106 that is inserted, for example, into the top of the lens barrel 26 and electrically connected to the PCB substrate 36 by metallic vias 108 through the barrel (see FIG. 17). Although the ambient light sensor 106 can be placed on or within any portion of the lens barrel 26, placing the ambient light sensor on or within the top of the portion of the lens barrel for the primary imager 22 can help maximize the FOV of the ambient light sensor.

Figure 18:
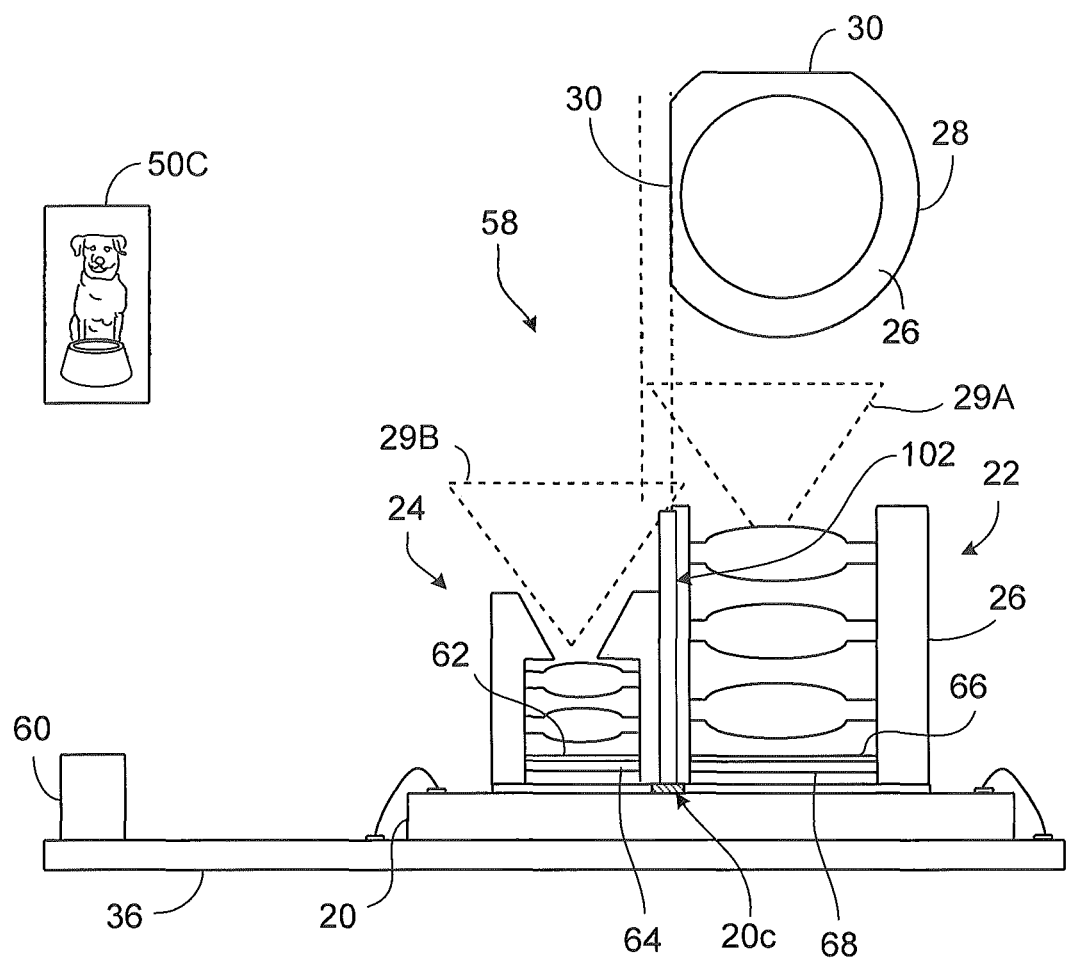
FIG. 18 illustrates a further example of an image sensor module that provides ambient light sensing.

The ambient light sensor (ALS) can be used, for example, to regulate the brightness of a display screen of the host device (e.g., a smart phone). Input from the ambient light sensor also may be used to estimate the light reflected from an object and to change the performance of a light projector 60 or other part of the imaging system in response to the detected light (see FIG. 18).

In general, different regions of the sensor may operate using different power levels or some regions may operate dynamically by modulating between high-power, low-power, and/or off modes. For example, some implementations may incorporate a customized architecture for the image sensor 20 such that discrete pixel areas corresponding to the ambient light sensor, primary imager and/or secondary imager(s) may operate in different power modes regardless of the other discrete pixel areas. In other implementations, for example, data from the pixels corresponding to discrete areas of the sensor (e.g., areas corresponding to the ambient light sensor, primary imager and/or secondary imagers) may be read and processed selectively.

Figure 19A:
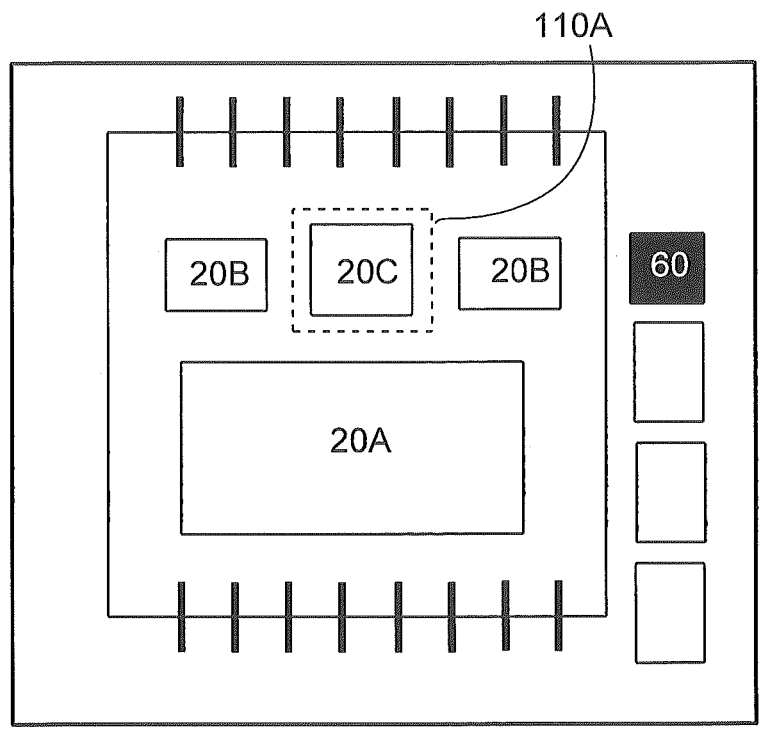
FIGS. 19A-19C illustrate examples of a sensor module providing spatially dynamic power consumption.

For example, as illustrated by FIG. 19A, discrete pixel areas corresponding to the ambient light sensor may define an active window 110A, such that only data from pixels within this area are read and processed. In a particular example of a low-power mode, the ambient light sensor pixels 20C would be operable to collect visible and/or IR light and/or UV light. The primary and secondary channels 20A, 20B, however, would not collect data during this particular low-power mode. During such a low-power mode of operation, the light projector 60 also could be off so as to reduce power consumption. Power consumption can be reduced, for example, by reading and processing data from only selected pixels instead of reading and processing data from all the pixels. Thus, for example, for ambient light sensing, images from the primary and secondary imagers 22, 24 are not needed; in that case, the active window would include only the ambient light sensing pixels 20C. Data from other pixels (including those associated with the primary channel 20A and the secondary channel 20B) would not be read or processed; instead, such pixels would be within an inactive window.

Figure 19B:
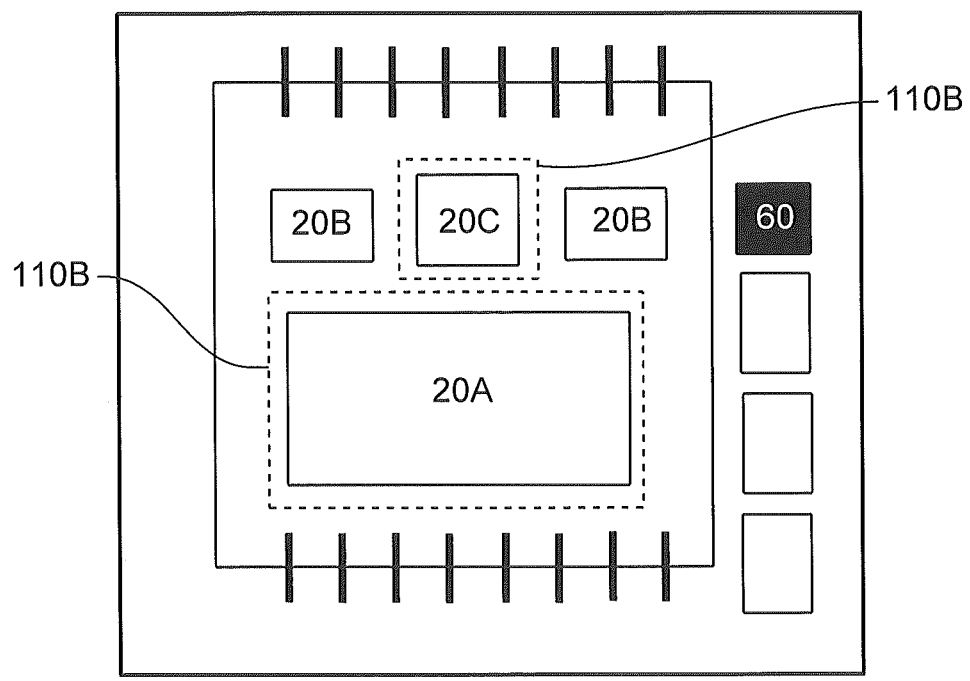
Figure 19C:
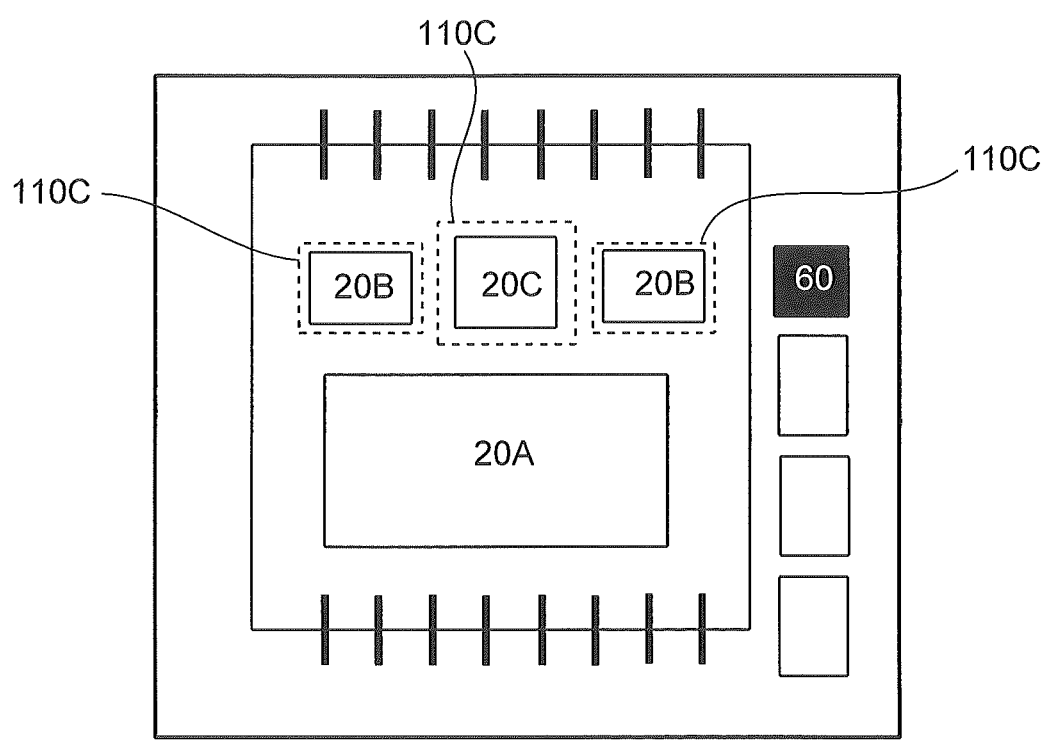

On the other hand, as shown by FIG. 19B, the primary channel 20A can be used to collect image data during a high-power mode, and the data from the ambient light sensing pixels 20C can be used to facilitate capture of the primary image (e.g., intensity data from the ambient light sensing pixels may be used to determine if a flash is needed in order to capture an image with the primary channel). In such cases, the active window 110B would include the pixel areas 20C, 20A corresponding, respectively, to the ambient light sensor 102 and the primary imager 22. Data from other pixels, such as those associated with the secondary imagers 24, would not be needed and would be within an inactive window. Further, in some cases, as shown by FIG. 19C, data from the ambient light sensor 102 may be used to modulate the intensity of the light projector 60. For example, if the secondary imagers 24 are used to collect images for depth information, intensity data from the ambient light sensor 102 may be used to determine whether the light projector 60 needs to be powered on. In such cases, the active window 110C would include pixels 20C, 20B associated, respectively, with the ambient light sensor 102 and the secondary imagers 24, but not the pixels 20A associated with the primary imager 22. Pixels 20A associated with the primary imager 22 would be within an inactive window.

Figure 20:
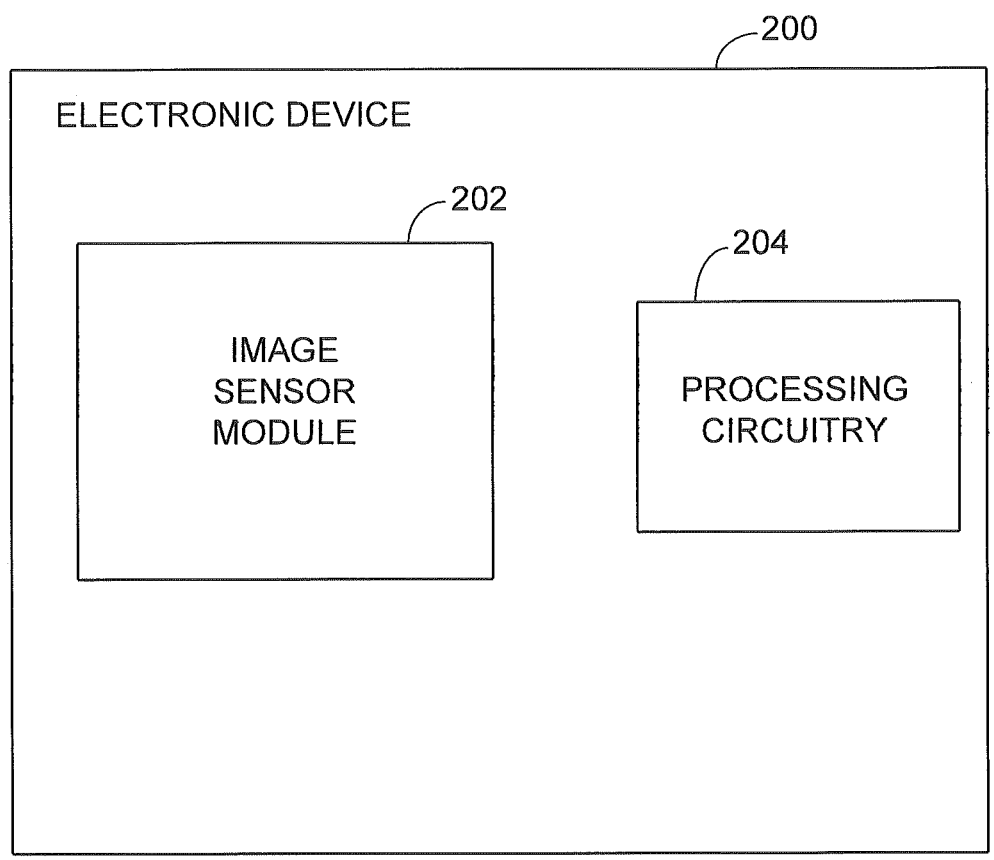
FIG. 20 is a block diagram of a device that includes an image sensor module.

Any of the foregoing image sensor modules (i.e., camera modules) can be integrated into an electronic or other device 200, as shown in FIG. 20. Examples of the device 200 include smart phones, as well as other portable computing devices (e.g., personal digital assistants (PDAs), laptops). An image sensor module 202 and processing circuitry 204A can be mounted, for example, on the same PCB in the device 200. The processing circuitry 204 is operable to read signals from the primary camera and secondary cameras in the module 202 and to processes the signal to generate a high-resolution image that incorporates the depth information. The processing circuitry 204 can be implemented, for example, as one or more integrated circuits in one or more semiconductor chips with appropriate digital logic and/or other hardware components (e.g., read-out registers; amplifiers; analog-to-digital converters; clock drivers; timing logic; signal processing circuitry; and/or microprocessor). The processing circuitry is, thus, configured to implement the various functions associated with such circuitry. Further, as explained above, the depth information can be obtained from signals generated by two or more secondary cameras, or from a combination of signals generated by the primary camera and one or more secondary cameras. The processing circuitry 204 can process the acquired data in known ways to generate a high-resolution image that incorporates the depth information.

Various implementations can include different combinations of the features described above. Further, various modifications can be made within the spirit and scope of the invention. Thus, other implementations are within the scope of the claims.

What is claimed is:

1. An image sensor module comprising:
   a semiconductor chip including photosensitive regions defining, respectively, a primary camera and a secondary camera,
   wherein the secondary camera has a field-of-view,
   the image sensor module further including:
      a first lens barrel for the primary camera that does not substantially obstruct the field-of-view of the secondary camera, and
      a second lens barrel for the secondary camera;
   wherein the first lens barrel holds a first stack of lenses and has an outer side surface, the outer side surface including
      a first substantially flat, planar section, and
      a second curved section extending from the first section,
      wherein the first substantially flat, planar section and the second curved section form a substantially cylindrical shape with at least one flat side,
      wherein a portion of a cylindrical surface of the substantially cylindrical shape is flattened to define the flat, planar section, wherein the flat, planar section extends in a direction perpendicular to the photosensitive region and is such that a transverse cross-section through the substantially cylindrical shape has at least one straight edge,
      wherein the first substantially flat, planar section forms the flat side of the cylindrical shape and the second curved section forms a curved wall of the cylindrical shape,
   wherein the second lens barrel holds a second stack of lenses,
   wherein a height of the first lens barrel is greater than a height of the second lens barrel, and
   wherein the secondary camera and the second lens barrel are disposed adjacent the first section of the first lens barrel.

2. The image sensor module of claim 1 wherein the outer side surface of an object-side of the first lens barrel has a truncated cone-shape.

3. The image sensor module of claim 1 wherein the first lens barrel has different outer diameters, the sizes of which decrease relative to one another in a direction toward an object-side of the first lens barrel.

4. The image sensor module of claim 1 wherein the outer side surface of the first lens barrel is stepped.

5. The image sensor module of claim 1 wherein the outer side surface of the first lens barrel includes at least one substantially flat, inclined side.

6. The image sensor module of claim 1 including a plurality of secondary cameras each of which has a field-of-view that is at least as large as a field-of-view of the primary camera.

7. The image sensor module of claim 1 wherein the primary camera provides high-resolution image information.

8. The image sensor module of claim 1 wherein the primary camera is RGB-sensitive and the at least one secondary camera is IR-sensitive.

9. The image sensor module of claim 1 further including an IR light projection unit.

10. The image sensor module of claim 1 further including a light projection unit, wherein the secondary camera is sensitive to light generated by the light projection unit.

11. The image sensor module of claim 1 including an additional secondary camera, wherein outer side surface of the first lens barrel has a third substantially flat, planar section, and wherein the additional secondary camera is disposed adjacent the third section of the outer side surface of the first lens barrel.

12. The image sensor module of claim 11 wherein the secondary camera and the additional secondary camera, respectively, have different wavelength filters, polarization filters and/or apertures sizes associated with them.

13. The image sensor module of claim 11 including an additional second lens barrel for the additional secondary camera, wherein the height of the first lens barrel is greater than a height of the additional second lens barrel.

14. The image sensor module of claim 11 wherein the first lens barrel is disposed between the second lens barrel and the additional second lens barrel.

15. The image sensor module of claim 11, wherein the third section extends from the second section, and wherein the second section is disposed between the first section and the third section.

* * * * *